US005583679A

United States Patent [19]
Ito et al.

[11] Patent Number: 5,583,679
[45] Date of Patent: Dec. 10, 1996

[54] LIQUID CRYSTAL DISPLAY WITH OPTICAL COMPENSATORY SHEET HAVING DISCOTIC MOLECULES VARYINGLY INCLINED

[75] Inventors: Yoji Ito; Yosuke Nishiura; Koh Kamada; Hiroyuki Mori; Taku Nakamura, all of Kanagawa, Japan

[73] Assignee: Fuji Photo Film Co., Ltd., Minami-ashigara, Japan

[21] Appl. No.: 454,847

[22] Filed: May 31, 1995

[30] Foreign Application Priority Data

| May 31, 1994 | [JP] | Japan | 6-118961 |
| Jun. 3, 1994 | [JP] | Japan | 6-122664 |
| Sep. 21, 1994 | [JP] | Japan | 6-226715 |
| Sep. 21, 1994 | [JP] | Japan | 6-226716 |
| Nov. 21, 1994 | [JP] | Japan | 6-286363 |
| Dec. 26, 1994 | [JP] | Japan | 6-322620 |

[51] Int. Cl.$^6$ .................. G02F 1/1335; G02F 1/1337
[52] U.S. Cl. .................. 349/118; 349/120; 349/121; 349/122; 349/136; 349/177
[58] Field of Search .................. 359/53, 73, 68, 359/75, 76, 74, 99, 101, 103, 494; 428/1; 252/299.01

[56] References Cited

U.S. PATENT DOCUMENTS

| 5,155,610 | 10/1992 | Hikmet et al. | 359/75 |
| 5,308,535 | 5/1994 | Scheuble et al. | 252/299.01 |
| 5,375,006 | 12/1994 | Haas | 359/73 |
| 5,460,748 | 10/1995 | Mazaki et al. | 252/299.01 |
| 5,518,783 | 5/1996 | Kawata et al. | 359/73 |

FOREIGN PATENT DOCUMENTS

| 2272779 | 5/1994 | United Kingdom | 359/63 |

*Primary Examiner*—William L. Sikes
*Assistant Examiner*—Tai V. Duong
*Attorney, Agent, or Firm*—Burns, Doane, Swecker & Mathis, LLP

[57] ABSTRACT

Disclosed is an optical compensatory sheet which comprises a transparent support and an optically anisotropic layer provided thereon, wherein the optically anisotropic layer comprises a compound having a discotic structure unit in its molecule and has negative birefringence, and the discotic structure unit has a plane inclined from a plane of the transparent support at an angle varying along a direction of depth of the anisotropic layer. A liquid crystal display and a color liquid crystal display provided with the optical compensatory sheet are also disclosed.

23 Claims, 14 Drawing Sheets

LIQUID CRYSTAL DISPLAY WITH OPTICAL COMPENSATORY SHEET HAVING DISCOTIC MOLECULES VARYINGLY INCLINED

BACKGROUND OF THE INVENTION

1. Field of the Invention

The present invention relates to an optical compensatory sheet, a liquid crystal display provided with the sheet, and a color liquid crystal display provided with the sheet.

2. Description of Prior Art

As a display for electronic office system-devices such as a desk-top personal computer and a word processor, CRT (cathode ray tube) has been employed so far. Recently, a liquid crystal display (hereinafter referred to as LCD) is widely employed instead of the CRT because of its small thickness, light weight and low power consumption. LCD generally has a structure that a liquid crystal cell is disposed between a pair of polarizing sheets. Most of LCD use a twisted nematic liquid crystal. Operational mode of LCD using the twisted nematic liquid crystal is roughly divided into a birefringence mode and an optical rotatory mode.

A super twisted nematic liquid crystal display (hereinafter referred to as STN-LCD) utilizing the birefringence mode uses a super twisted nematic liquid crystal showing a twisted angle of more than 90 degrees and having steep electro-optical characteristics. Such STN-LCD, therefore, has an advantage of giving display of a large volume by driving in time-sharing mode. However, the STN-LCD has disadvantages such as slow response (such as several hundred milliseconds) and difficulty in giving satisfactory gradation on display, and therefore its display characteristics are relatively poor, as compared with display characteristics of a liquid crystal display using the known active-type elements (e.g., TFT-LCD and MIM-LCD).

In the TFT-LCD and MIM-LCD, twisted nematic liquid crystal showing a twisted angle of 90 degrees and having positive birefringence is employed for displaying an image. This is called LCD of an optically rotary mode (i.e., TN-LCD). TN-LCD display mode shows rapid response (such as several tens of milliseconds) and high display contrast, and easily gives black-white display of high contrast. Hence, the optical rotatory mode has a number of advantages compared with the birefringence mode or other modes. However, TN-LCD has disadvantages that color or contrast on display varies depending upon viewing angle to a liquid crystal display, and its display characteristics are not comparable to display characteristics of CRT.

In order to improve the viewing angle characteristics (i.e. to enlarge the viewable angle), arrangement of a phase difference film (optical compensatory sheet) between a pair of polarizing plates and TN liquid crystal cell has been proposed by Japanese Patent Provisional Publications No. 4(1992)-229828 and No. 4(1992)-258923.

The optical compensatory sheets proposed in these Publications show no optical effect when a liquid crystal display is seen from the direction vertical to a screen of the display because phase difference in the direction perpendicular to a surface of the liquid crystal display is almost zero. However, the optical compensatory sheet serves for compensation of phase difference (depending upon wavelengths of light) that occurs when the liquid crystal display is viewed from an oblique direction. The phase difference results in unfavorable viewing angle characteristics such as coloring and disappearance of displayed image.

It is known that the optical compensatory sheet is needed to have negative birefringenece for compensating positive birefringence of the twisted nematic liquid crystal and an inclined optic axis.

Japanese Patent Provisional Publication No. 6(1994)-75116 and EP0576304 A1 disclose an optical compensatory sheet having the negative birefringence and inclined optic axis. In more detail, the disclosed sheet is prepared by stretching a polymer such as polycarbonate or polyester and has the directions of the main refractive indices which are inclined from the normal of the sheet. To prepare the above sheet by the stretching treatment, extremely complicated treatment are required. Therefore an optical compensatory sheet of a large surface area cannot be easily prepared according to the disclosed process.

Also known is an optical compensatory sheet comprising a liquid crystalline polymer. For instance, Japanese Patent Provisional Publications No. 3(1991)-9326 and No. 3(1991)-291601 disclose an optical compensatory sheet for LCD which is prepared by coating a solution of polymer showing liquid crystal property on an orientation layer provided on a support film. However, the polymer showing liquid crystal property is not satisfactorily oriented on the orientation layer. Further, the polymer does not generally show negative birefringence. Hence, the resulting compensatory sheet scarcely enlarges the viewing angle from all directions.

Japanese Patent Provisional Publication No. 5(1993)-215921 discloses the use of a birefringence plate (optical compensatory sheet) comprising a support and a polymerizable lod-like compound showing liquid crystal property and positive birefringence. The birefringence plate is prepared by coating a solution of the lod-like compound on the support and curing the compound under heating. However, the cured layer dose not show negative birefringence. Hence, the resulting compensatory sheet scarcely enlarges the viewing angle from all directions.

SUMMARY OF THE INVENTION

It is an object of the present invention to provide an optical compensatory sheet which gives an enlarged viewing angle and can be easily prepared.

It is another object of the invention to provide an optical compensatory sheet which has the negative birefringence and the minimum retardation value in a direction inclined from the normal of the sheet (corresponding to optic axis) and can be prepared by relatively simple method.

It is a further object of the invention to provide a liquid crystal display provided with an optical compensatory sheet which has an enlarged viewing angle and is almost free from reversion of black-and-white image or gradation.

It is a further object of the invention to provide a color liquid crystal display provided with an optical compensatory sheet which gives an enlarged viewing angle and is almost free from reversion of black-and-white image or gradation.

There is provided by the invention an optical compensatory sheet which comprises a transparent support and an optically anisotropic layer provided thereon, wherein the optically anisotropic layer comprises a compound having a discotic structure unit in its molecule and has a negative birefringence, and the discotic structure unit has a plane inclined from a plane of the transparent support at an angle varying along a direction of depth of the optically anisotropic layer.

Preferred optical compensatory sheets according to the invention are as follows:

1) The optical compensatory sheet wherein the angle increases with increase of distance in the direction of depth from the bottom of the optically anisotropic layer.

2) The optical compensatory sheet wherein the angle varies within the range of 5 to 85 degree (preferably 10 to 70 degrees).

3) The optical compensatory sheet wherein the minimum of the angle is in the range of 0 to 85 degrees (preferably 5 to 40 degrees) and the maximum of the angle is in the range of an angle of 5 to 90 degree (preferably 30 to 85 degrees).

4) The optical compensatory sheet as described above 3) wherein the difference of the minimum and the maximum of the angles is in the range of 5 to 70 degrees (preferably 10 to 60 degrees).

5) The optical compensatory sheet wherein the angle continuously varies (preferably increases) with increase of distance in the direction of depth from the bottom of the optically anisotropic layer.

6) The optical compensatory sheet wherein the optically anisotropic layer further contains cellulose ester.

7) The optical compensatory sheet wherein the optically anisotropic layer further contains acetylbutyrylcellulose (i.e., cellulose acetate butyrate).

8) The optical compensatory sheet wherein the optical compensatory sheet has haze of not more than 5.0.

9) The optical compensatory sheet wherein the optically anisotropic layer is in the condition of mono-domain or in the condition of domains of a size of not more than 0.1 μm.

10) The optical compensatory sheet wherein an orientation layer is provided between the transparent support and the optically anisotropic layer.

11) The optical compensatory sheet described above 10) wherein a subbing layer is provided between the transparent support and the orientation layer.

12) The optical compensatory sheet wherein a protective layer is provided on the optically anisotropic layer.

13) The optical compensatory sheet wherein the optically anisotropic layer has a direction of the minimum absolute retardation value which is inclined from the normal of the sheet and is not optic axis (i.e., the optically anisotropic layer has the minimum of absolute values of retardation values in a direction inclined from the normal of the sheet and has no optic axis).

14) The optical compensatory sheet wherein the transparent support has a light transmittance of not less than 80% and has its optic axis in the direction of the normal of the support.

15) The optical compensatory sheet as described above 10) wherein the orientation layer is a polymer layer which has been subjected to rubbing treatment.

16) The optical compensatory sheet as described above 10) wherein the orientation layer is prepared by obliquely depositing an inorganic compound on the support.

Further, there is provided by the invention a liquid crystal display comprising a liquid crystal cell which comprises a pair of substrates provided with a transparent electrode and twist-oriented nematic liquid crystal sealed therebetween, a pair of polarizing plates arranged on both sides of the cell, an optical compensatory sheet provided between the liquid crystal cell and the polarizing sheet;

wherein the optical compensatory sheet comprises a transparent support and an optically anisotropic layer provided thereon, and the optically anisotropic layer comprises a compound having a discotic structure unit in its molecule and has a negative birefringence, the discotic structure unit having a plane inclined from a plane of the transparent support at an angle varying along a direction of depth of the optically anisotropic layer.

Preferred embodiments of the liquid crystal display of the invention are as follows:

1) The liquid crystal display wherein the angle increases with increase of distance in the direction of depth from the bottom of the optically anisotropic layer.

2) The liquid crystal display wherein the angle varies within the range of 5 to 85 degree.

3) The liquid crystal display wherein the minimum of the angle is in the range of 0 to 85 degrees (preferably 5 to 40 degrees) and the maximum of the angle is in the range of an angle of 5 to 90 degree (preferably 30 to 85 degrees).

4) The optical compensatory sheet wherein the optically anisotropic layer further contains cellulose ester (preferably, acetylbutyrylcellulose).

5) The optical compensatory sheet wherein an orientation layer is provided between the transparent support and the optically anisotropic layer.

6) The liquid crystal display wherein the optically anisotropic layer has a direction of the minimum absolute retardation value which is inclined from the normal of the sheet and is not optic axis.

7) The liquid crystal display as described above 6), wherein the optical compensatory sheet is arranged in such a manner that a direction given when the direction of the minimum absolute retardation value is orthographically projected on the cell has an angle of 90 to 270 degrees with a rubbing direction of a surface of a substrate of the liquid crystal cell adjacent to the optical compensatory sheet.

8) The liquid crystal display wherein the optical compensatory is arranged between the liquid crystal cell and the polarizing sheet in such a manner that one or two optical compensatory sheet is provided on one side of the liquid crystal cell or two optical compensatory sheets are provided on both sides of the liquid crystal cell.

Furthermore, there is provided by the invention a color liquid crystal display comprising a liquid crystal cell which comprises a pair of substrates provided with a transparent electrode, a transparent electrode of picture element and color filter, and twist-oriented nematic liquid crystal sealed between the substrates, a pair of polarizing plates arranged on both sides of the cell, and an optical compensatory sheet provided between the liquid crystal cell and the polarizing sheet;

wherein the optical compensatory sheet comprises a transparent support and an optically anisotropic layer provided thereon, and the optically anisotropic layer comprises a compound having a discotic structure unit in its molecule and has a negative birefringence, the discotic structure unit having a plane inclined from a plane of the transparent support at an angle varying along a direction of depth of the optically anisotropic layer.

Preferred embodiments of the color liquid crystal display of the invention are as follows:

1) The color liquid crystal display wherein the angle increases with increase of distance in the direction of depth from the bottom of the optically anisotropic layer.

2) The color liquid crystal display wherein the angle varies within the range of 5 to 85 degree.

3) The color liquid crystal display wherein the minimum of the angle is in the range of 0 to 85 degrees (preferably 5 to 40 degrees) and the maximum of the angle is in the range of an angle of 5 to 90 degree (preferably 30 to 85 degrees).

4) The color liquid crystal display wherein the optically anisotropic layer further contains cellulose ester (preferably acetylbutyrylcellulose).

5) The color liquid crystal display wherein an orientation layer is provided between the transparent support and the optically anisotropic layer.

6) The color liquid crystal display wherein a pair of substrates mentioned above is composed of one substrate provided with a transparent electrode of picture element and the other substrate provided with an opposite transparent electrode and color filter.

7) The color liquid crystal display described above 6) wherein the transparent electrode of picture element has TFT (thin-film-transistor) or MIM (metal-insulator-metal) element as non-linear active element.

8) The color liquid crystal display wherein the absorption axes of two polarizing plates meet at right angles and which is for normally white mode.

9) The color liquid crystal display wherein the absorption axes of two polarizing plates are parallel and which is for normally black mode.

10) The color liquid crystal display wherein the optically anisotropic layer has a direction showing the minimum of absolute values of retardation values which is inclined from the normal of the sheet and is not optic axis.

11) The color liquid crystal display as described above 10), wherein the substrates of the liquid crystal cell have a surface having been rubbed in one direction to give an orientation surface, and the optical compensatory sheet is arranged in such manner that a direction given when the direction of the minimum absolute retardation value is orthographically projected on the cell has an angle of 90 to 270 degrees with a rubbing direction of a surface of a substrate of the liquid crystal cell adjacent to the optical compensatory sheet.

The optical compensatory sheet of the invention has a structure that an optically anisotropic layer which has a negative birefringence and comprises a compound having a discotic structure unit in its molecule is formed on a transparent sheet or the orientation layer provided on a transparent sheet. Further, the discotic structure unit has a plane inclined from a plane of the transparent support at an angle varying along a direction of depth of the optically anisotropic layer.

The liquid crystal display provided with the sheet shows a greatly enlarged viewing angle, and is almost free from reversion of black-and-white image or gradation, and coloring of a displayed image. The reason is because the variation (preferably increase) of inclined angle of discotic structure unit (plane) of the optically anisotropic layer compensates the phase difference by orientation of liquid crystal of the liquid crystal cell on application of voltage.

Further, the color liquid crystal display of the invention provided with the optical compensatory sheet shows enlarged viewing angle in a color display by gradation and is improved in the viewing characteristics such as reversion of black-and-white image or gradation when the viewing direction to the liquid crystal display is greatly inclined from the normal to a surface of the screen, because the sheet is capable of almost completely compensating the phase difference.

Furthermore, the sheet shows high contrast in the case that the liquid crystal cell with the sheet is viewed from the front side, because the sheet generally has low haze (i.e., low cloudiness).

BRIEF DESCRIPTION OF THE DRAWINGS

FIG. 6 is viewed from a direction of z axis.

FIG. 8 is viewed from a direction of z axis.

FIG. 10 is viewed from a direction of z axis.

DETAILED DESCRIPTION OF THE INVENTION

Figure 1:
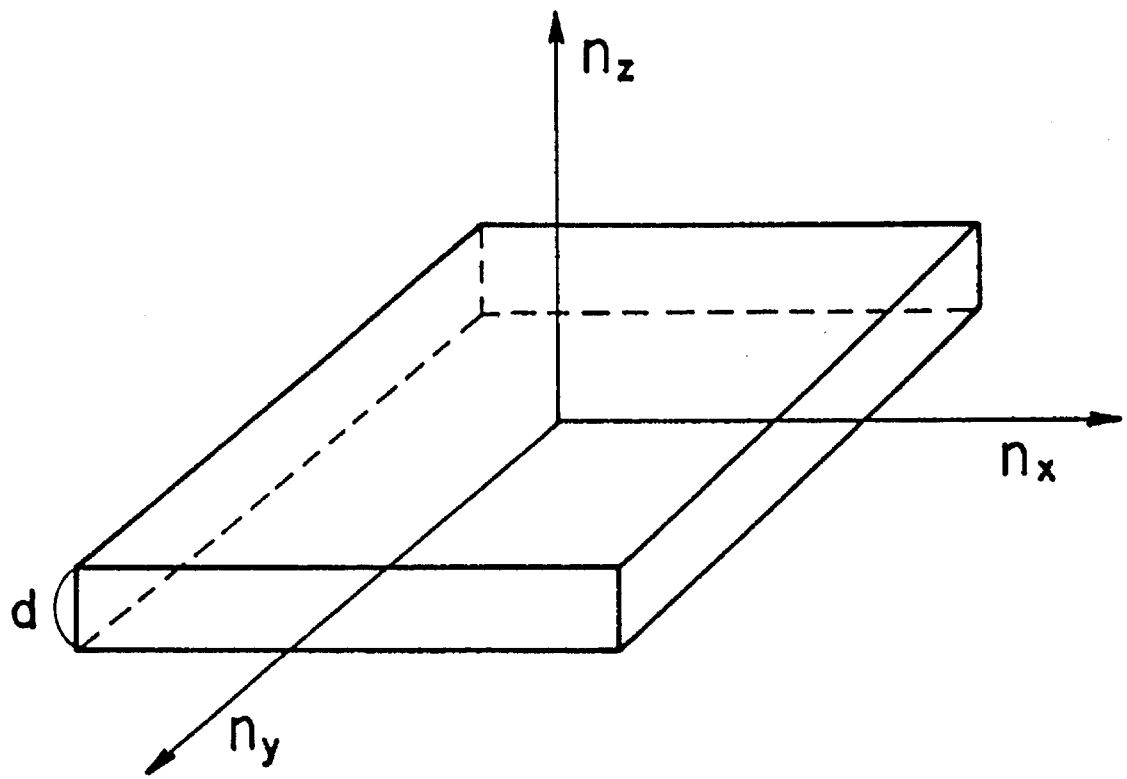
FIG. 1 is a view schematically showing the refractive indices of the three axes of the transparent film of the invention.

The optical compensatory sheet of the invention comprises an optically anisotropic layer having a negative birefringence which comprises a compound having a discotic structure unit in its molecule. Examples of the compound includes a discotic liquid crystalline compound having low molecular weight such as monomer and a polymer obtained by polymerization of a polymerizable discotic liquid crystalline compound.

The discotic compounds are generally classified into a compound having discotic liquid crystalline phase (e.g., discotic nematic phase) and a compound having no discotic liquid crystalline phase. The discotic compound generally has a negative birefringence. The invention has been attained by utilizing the negative birefringence of the discotic compound and arranging the discotic structure unit in the optical compensatory sheet such a manner that its plane is inclined from a plane of the transparent support at an angle varying along a direction of depth of the optically anisotropic layer.

The optical compensatory sheet of the invention is composed of a transparent support and an optically anisotropic layer thereon comprising the discotic compound, and it is preferred that an orientation layer is further provided between the support and the optically anisotropic layer. The orientation layer may be provided on the optically anisotropic layer in the case that the optically anisotropic layer plurally are provided on the support. A subbing layer (i.e., adhesive layer) is preferably provided between the transparent support and the orientation layer. A protective layer may be provided on the layer or on another side of the support.

As material of the transparent support of the invention, any material can be employed, so long as it is transparent. The material preferably has a transmittance of not less than 80% and specially shows optical isotropy when it is viewed from a front side. Further, the film preferably has a negative uniaxial property and an optic axis in the normal line direction.

Therefore, the film is preferably prepared from material having a small intrinsic birefringence, such as triacetyl cellulose. Such material is available on market the trade name of Geonex (from Nippon Geon Co., Ltd.), Arton (from Japan Synthetic Rubber Co., Ltd.) and Fuji TAC (from Fuji Photo Film Co., Ltd.). Moreover, materials having a large intrinsic birefringence such as polycarbonate, polyarylate, polysulfone and polyethersulfone can be also employed by rendering the materials optically isotropic by appropriately controlling molecular orientation in the procedure of forming a film.

The transparent film generally satisfies the condition of:

$$nz < nx = ny$$

and preferably satisfies the condition of:

$$20 \leq \{(nx+ny)/2 - nz\} \times d \leq 400 \ (nm)$$

in which nx and ny is main refractictive indices within the film and nz is a main refractive index in a thickness direction of the film, and more preferably satisfies the condition of:

$$30 \leq [(nx+ny)/2 - nz] \times d \leq 150$$

In practical, it is not required that nx is exactly equal to ny, and it is satisfactory condition that nx is almost equal to ny. Therefore, the transparent film preferably satisfies the condition of:

$$|nx - ny|/|nx| \leq 0.2$$

in which nx and ny have the same meanings as above and d is a depth (i.e., thickness) direction of the film.

Further, "|nx−ny|×d" of retardation from front side (when the display is viewed from the front side) preferably is not more than 50 nm, especially not more than 20 nm.

"nx", "ny", "nz" and "d" described above are shown in FIG. 1. "nx" and "ny" are main refractictive indices on the plane of the film, "nz" is a main refractive index in a thickness direction of the transparent support, and d is the thickness of the film.

A subbing layer is preferably formed on the transparent support to increase bonding strength between the transparent support and the orientation layer.

The formation of the subbing layer is generally formed on the transparent support by a coating method after providing a surface activation treatment such as a chemical treatment, a mechanical treatment, a corona discharge treatment, a flame treatment, a UV treatment, a high frequency wave treatment, a glow discharge treatment, an active plasma treatment, and an ozone oxidation treatment (preferably a glow discharge treatment).

The subbing layer may comprise a first subbing layer highly bonding to the support and a second subbing layer (hydrophilic resin layer) highly bonding to the orientation layer (double-layer process), or is composed of only one layer comprising resin having both of a hydrophilic group and a hydrophobic group (single-layer process).

Examples of known materials for the first subbing layer in the double-layer process include copolymers derived from vinyl chloride, vinylidene chloride, butadiene, methacrylic acid, acrylic acid, iraconic acid, and maleic anhydride; polyethyleneimine; an epoxy resin; a grafted gelatin; nitrocellulose; halogen-containing resin such as polyvinyl bromide, polyvinyl fluoride, polyvinyl acetate, chlorinated polyethylene, chlorinated polypropylene, brominated polyethylene, chlorinated rubber, vinyl chloride/ethylene copolymer, vinyl chloride/propylene copolymer, vinyl chloride/styrene copolymer, isobutylene chloride containing copolymer, vinyl chloride/vinylidene chloride copolymer, vinyl chloride/styrene/maleic anhydride copolymer, vinyl chloride/styrene/acrylonitrile copolymer, vinyl chloride/butadiene copolymer, vinyl chloride/isoprene copolymer, vinyl chloride/chlorinated propylene copolymer, vinyl chloride/vinylidene chloride/vinyl acetate copolymer, vinyl chloride/acrylic acid ester copolymer, vinyl chloride/maleic acid ester copolymer, vinyl chloride/methacrylic acid ester copolymer, vinyl chloride/acrylonitrile copolymer, internally plasticized poly(vinyl chloride), vinyl chloride/vinyl acetate copolymer, poly(vinylidene chloride), vinylidene chloride/methacrylic acid ester copolymer, vinylidene chloride/acrylonitrile copolymer, vinylidene chloride/acrylic acid ester copolymer, chloroethyl vinyl ether/acrylic acid ester copolymer and polychloroprene; α-olefin polymers such as polyethylene, polypropylene, polybutene, poly-3-methylbutene and poly-1,2-butadiene; copolymers such as ethylene/propylene copolymer, ethylene/vinyl ether copolymer, ethylene/propylene/1,4-hexadiene copolymer, ethylene/vinyl acetate copolymer, 1-butene/propylene copolymer and butadiene/acrylonitrile copolymer, and blends of these copolymers and halogen-containing resins; acrylic resin such as methylacrylate/acrylonitrile copolymer, ethyl acrylate/styrene copolymer, methyl methacrylate/acrylonitrile copolymer, poly(methyl methacrylate), methyl methacrylate/styrene copolymer, butyl methacrylate/styrene copolymer, polymethyl acrylate, polymethyl α-chloroacrylate, polymethoxyethyl acrylate, polyglycidylacrylate, polybutyl acrylate, polymethyl acrylate, polyethyl acrylate, acrylic acid/butyl acrylate copolymer, acrylic acid ester/butadiene/styrene copolymer, and methacrylic acid ester/butadiene/styrene copolymer; resins of styrene such as polystyrene, poly-α-methylstyrene, styrene/dimethylfumarate copolymer, styrene/maleic anhydride copolymer, styrene/butadiene copolymer, styrene/butadiene/acrylonitrile copolymer, poly(2,6-dimethylphenleneoxide) and styrene/acrylonitrile copolymer; polyvinyl carbazole; poly(p-xylylene); polyvinyl formal; polyvinyl acetal; polyvinyl butyral; poll/vinyl phthalate; cellulose triacetate; cellulose butyrate; cellulose phthalate; nylon 6; nylon 66; nylon 12; methoxymethyl-6-nylon; nylon-6, 10-polycapramide; poly-N-butyl-nylon-6-polyethylene sebacate; polybutylene glutarate; polyhexamethylene adipate; polybutylene isophthalate; polyethylene terephthalate; polyethylene adipate; polyethylene adipate terephthalate; polyethylene-2,6-naphthalate; polydiethylene glycol terephthalate; polyethyleneoxybenzoate; bisphenol A isophthalate; polyacrylonitrile; biphenyl A adipate; polyhexamethylene-m-benzenesulfoneamide; polytetramethylene-hexamethylene carbonate; polydimethyl siloxane; polyethylene methylene-bis-4-phenylene carbonate; and bisphenol A polycarbonate (described in, for example, E,. H. Immergut "Polymer Handbook", Vol. IV. pages 187–231, Interscience Pub. New York, 1988).

An example of a known material for the second subbing layer includes gelatin.

In the single-layer process, a support is swollen and is internally mixed with a hydrophilic polymer for the subbing layer to obtain a high bonding strength in many cases. Examples of materials for the subbing layer include a water soluble polymers, cellulose esters, polymer latex, and a water soluble polyester. Examples of materials for the water soluble polymer include gelatin, gelatin derivatives, casein, agar, sodium alginate, starch, polyvinyl alcohol, an acrylic acid-containing copolymer and a maleic anhydride -containing copolymer. Examples of materials for the cellulose ester include carboxymethylcellulose and hydroxyethylcellulose. Examples of materials for the latex polymer include vinyl chloride-containing copolymer, a vinylidene chloride-containing copolymer, acrylic acid ester-containing copolymer, vinyl acetate-containing copolymer, and a butadiene-containing copolymer. Gelatin particularly is preferred. Preferred examples of gelatin include lime-treated gelatin and acid-treated gelatin. These gelatins may contain, in the amount of 0.01 to 20,000 ppm, impurity such as metals (e.g., Na, K, Li, Rb, Ca, Mg, Ba, Ce, Fe, Sn, Pb, Al, Si, Ti, Au, Ag, Zn and Ni, and ions thereof), and ions (e.g., $F^-$, $Cl^-$, $Br^-$, $I^-$, $SO_4^{2-}$, $NO_3^-$, $CH_3COO^-$ and $NH_4^+$). The lime-treated gelatin generally contains Ca ion and Mg ion in the amount of 10 to 3,000 ppm, preferably not more than 1,000 ppm, and especially not more than 500 ppm.

Preferred examples of materials for the subbing layer are set forth below.

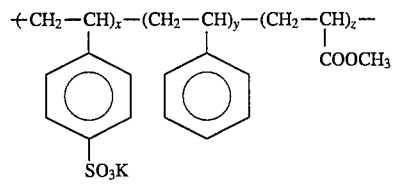

P-1 x:y:z = 25:60:15

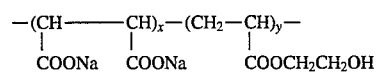

P-2 x:y = 70:30
Mean molecular weight: 45,000

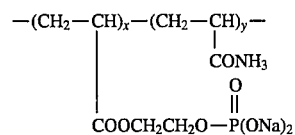

P-3 x:y = 50:50
Mean molecular weight: 12,000

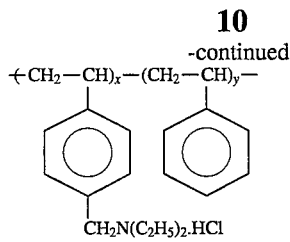

P-4 x:y = 30:70
State: latex

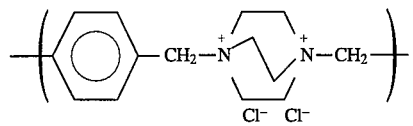

Mean molecular weight: 10,000

Examples of the gelatin hardeners include a chromium salt (e.g., chrome alum), aldehydes (e.g., formaldehyde and glutaraldehyde), isocyanates, an active halogen compound (e.g., 2,4-dichloro-6-hydroxy-s-triazine), epichlorohydrin resin, cyanuric acid chloride compound, vinyl sulfone or sulfonyl compound, carbamoyl ammonium chloride compound, amidinium salt compound, carbodiimide compound and, pyridinium salt compound.

The subbing layer may contain, as a matting agent, inorganic fine particles such as $SiO_2$, $TiO_2$, calcium carbonate or magnesium carbonate, or fine particles of a polymer such as polymethyl methacrylate copolymer, cellulose acetate propionate or polystyrene. The diameter of the matting agent preferably is in the range of 0.01 to 10 μm, especially 0.05 to 5 μm. The matting agent is preferably contained in the subbing layer in the range of 0.5 to 600 mg/m², especially in the range of 1 to 400 mg/m².

The subbing layer may further contain a surface active agent, an antistatic agent, and a pigment.

The orientation layer is generally provided on the transparent support or the above subbing layer. The orientation layer has a function of defining an orientation direction of a discotic liquid crystalline compound to be provided thereon by a coating method, and the orientation gives an optic axis inclined from an optical compensatory sheet. As the orientation layer, any layers can be employed so long as they are capable of imparting orientation property to an optically anisotropic layer (layer of discotic compound). Preferred examples of the orientation layer include a layer of an organic compound (preferably polymer) subjected to rubbing treatment, an obliquely deposited layer of an inorganic compound, and a layer having micro grooves. Further, a built-up film formed according to Langmuir-Blodgett technique (LB technique) from ω-tricosanoic acid, dioctadecyldimethylammoniumchloride, methyl stearate or an azobenzene derivative, that is isomerized by means of light to form a thin film of the molecules tilted uniformly in a certain direction, can be used as the orientation layer. In addition, a layer prepared by orienting dielectric materials by application of electric field or magnetic field can be employed as the orientation layer.

Examples of material for the orientation layer include polymers such as polymethyl metacrylate, acrylic acid/methacrylic acid copolymer, styrene/maleinimide copolymer, polyvinyl alcohol, poly(N-methylolacrylamide), styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene, and polycarbonate; and organic substances such as silan coupling agents.

Preferred examples of polymers for the orientation layer include polyimide, polystyrene, polymer of styrene derivatives, gelatin, polyvinyl alcohol and polyvinyl alcohol having an alkyl group (preferably having 6 or more carbon atoms). Orientation layers obtained by subjecting films of these polymers to orientation treatment, are capable of tilting obliquely discotic liquid crystalline compound. Further, silylated agent treated glass plate can be employed as the support having the orientation layer.

The polyvinyl alcohol having an alkyl group is especially preferred from the viewpoint of uniform orientation of the discotic liquid crystal. It is presumed that interaction between the alkyl chain on the orientation layer and the discotic liquid crystal gives high orientation. The alkyl group of the polyvinyl alcohol is preferably present as a side or terminal group of the polyvinyl alcohol, and especially as a terminal group. The alkyl group preferably has 6–14 carbon atoms, and the alkyl group is preferably attached to the polyvinyl alcohol through —S—, —(CH$_3$)C(CN)— or —(C$_2$H$_5$)N—CS—S—. The polyvinyl alcohol preferably has a saponification value of not less than 80% and a degree of polymerization of not less than 200. The polyvinyl alcohol having an alkyl group is available as trade names of MP103, MP203 and R1130 (produced by Kuraray Co., Ltd.)

A polyimide film (preferably fluorine-containing polyimide film), which is widely used as an orientation layer for a liquid crystal cell, is also preferably employed as the orientation layer of the invention. The polyimide film can be prepared by coating a solution of polyamic (polyamide) acid (e.g., a series of LQ/LX available from Hitachi Chemical Co., Ltd.; and a series of SE available from Nissan Chemical Industries, Ltd.) on the transparent support, dried at 100° to 300° C. for 0.5 to 1 hour, and rubbing a surface of the resultant polyimide film.

The orientation layer for the discotic liquid crystalline compound can be rubbed in the known manner which is conventionally employed to prepare an orientation layer or surface for liquid crystal of LCD. In more detail, the treatment is performed to give a function of orienting a liquid crystal to a surface of the orientation layer by rubbing the surface in a certain direction by the use of paper, gauze, felt, rubber, or fiber of polyamide or polyester. The rubbing procedure is generally performed by rubbing a surface of the orientation layer in several times using cloth.

As the orientation layer, an obliquely deposited layer of an inorganic compound is also employable. Examples of the inorganic compounds include metal oxides or metal fluorides such as SiO, TiO$_2$, MgF$_2$ and ZnO$_2$ and metals such as Au and Al. As the inorganic compounds, any compounds can be employed, so long as they have high dielectric constant (permittivity). The obliquely deposited layer of an inorganic compound can be prepared using the metallizing apparatus. The support may be metallized in the fixed condition, or the continuous support may be continuously metallized to give a continuous layer.

Other methods for orienting an optically anisotropic layer (layer of discotic liquid crystalline compound) with no using the orientation layer, include those applying magnetic field or electric field to the layer provided on a support at desired angle under heating for forming discotic nematic phase.

The optically anisotropic layer is formed on the transparent support or the orientation layer. The optically anisotropic layer of the invention has a negative birefringence and comprises a compound having a discotic structure unit in its molecule. In more detail, the layer generally comprises a discotic liquid crystalline compound or a polymer that a polymerizable discotic liquid crystalline compound is polymerized (cured). The optically anisotropic layer preferably comprises the polymer.

Examples of the discotic liquid crystalline compound employed in the invention include the following compounds:

Examples of the compounds include benzene derivatives described in C. Destrade et al., Mol. Cryst. vol. 71, pp. 111, 1981, truxene derivatives described in C. Destrade et al., Mol Cryst. vol. 122, pp. 141. 1985, Physics lett. A, vol. 78, pp. 82, 1980, cyclohexane derivatives described in B. Kohn et al., Angew. Chem. vol. 96, pp. 70, 1984, macrocyclic compounds of azacrown-type or phenylacetylene-type described in J. M. Lehn et al., J. Chem. Commun. pp. 1794, 1985, and J. Zhang et al., J. Am. Chem. Soc. vol. 116, pp. 2655, 1994. The discotic liquid crystal generally has a structure that the above compound is located at a center of the crystal as a parent core and further straight chain groups such as alkyl, alkoxy and benzoyl having a substituent are radially bonded to the compound. As the discotic liquid crystals, any discotic liquid crystals can be used, so long as the liquid crystals have a negative birefringence (negative uniaxial property) and orientation property.

Preferred examples of the discotic liquid crystalline compounds employable in the invention are described below.

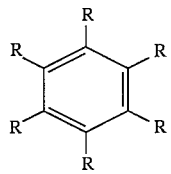

TE-1

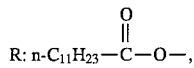

R: n-C$_{11}$H$_{23}$—C(=O)—O—,

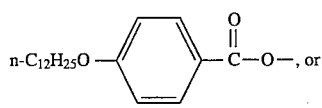

n-C$_{12}$H$_{25}$O—⟨⟩—C(=O)—O—, or

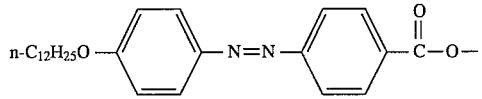

n-C$_{12}$H$_{25}$O—⟨⟩—N=N—⟨⟩—C(=O)—O—

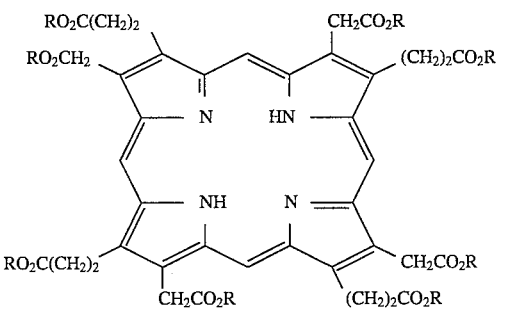

TE-2

R: n-C$_{12}$H$_{25}$—

TE-3
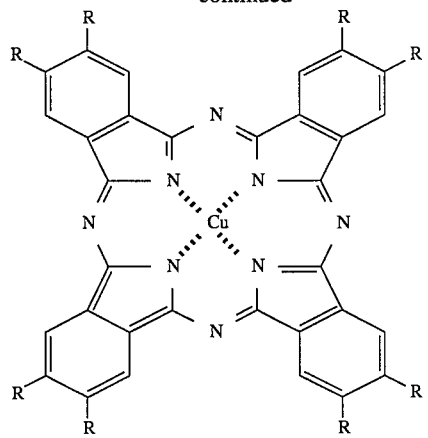
R: n-C$_{12}$H$_{25}$OCH$_2$—
TE-4
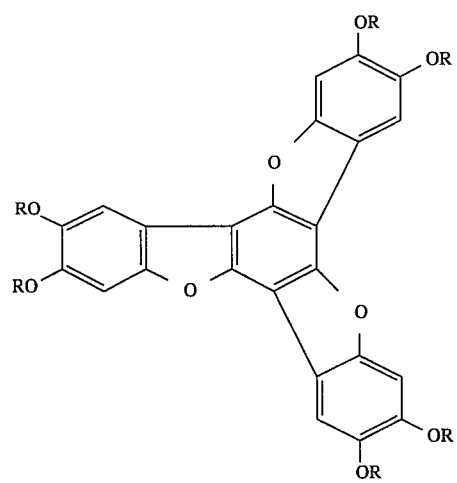
n-C$_{13}$H$_{27}$CO—
TE-5
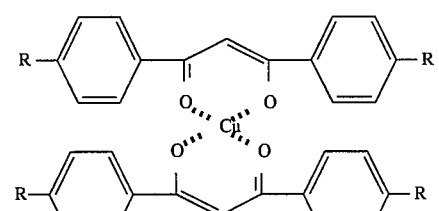
R: n-C$_{10}$H$_{21}$—
TE-6
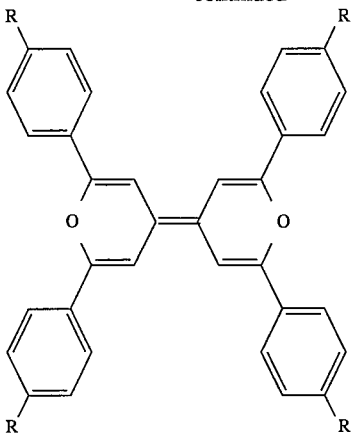
R: n-C$_8$H$_{17}$—
TE-7
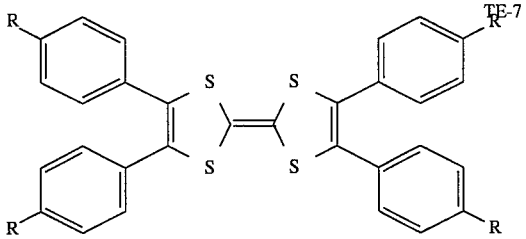
R: n-C$_{16}$H$_{33}$O—
TE-8
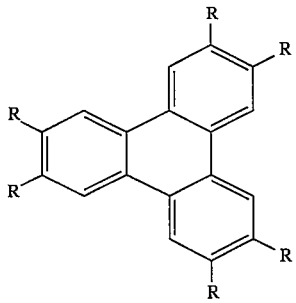
R:
n-C$_m$H$_{2m+1}$O—     (1)
(m = an integer of 2–15),
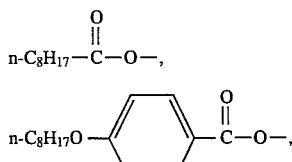  (2)
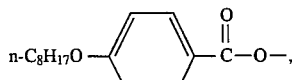  (3)
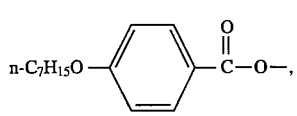  (4)
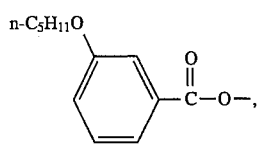  (5)

(6)

n-C_mH_{2m+1}O—[phenyl]—CH=CH—C(=O)—O—

(m = an integer of 7–10), (7)

CH_2—CH—C_mH_{2m}—O—[phenyl]—C(=O)—O—
  \O/

(m = an integer of 4–10), or (8)

CH_2=CH—C(=O)—O—C_mH_{2m}—O—[phenyl]—C(=O)—O—

(m = an integer of 4–10)

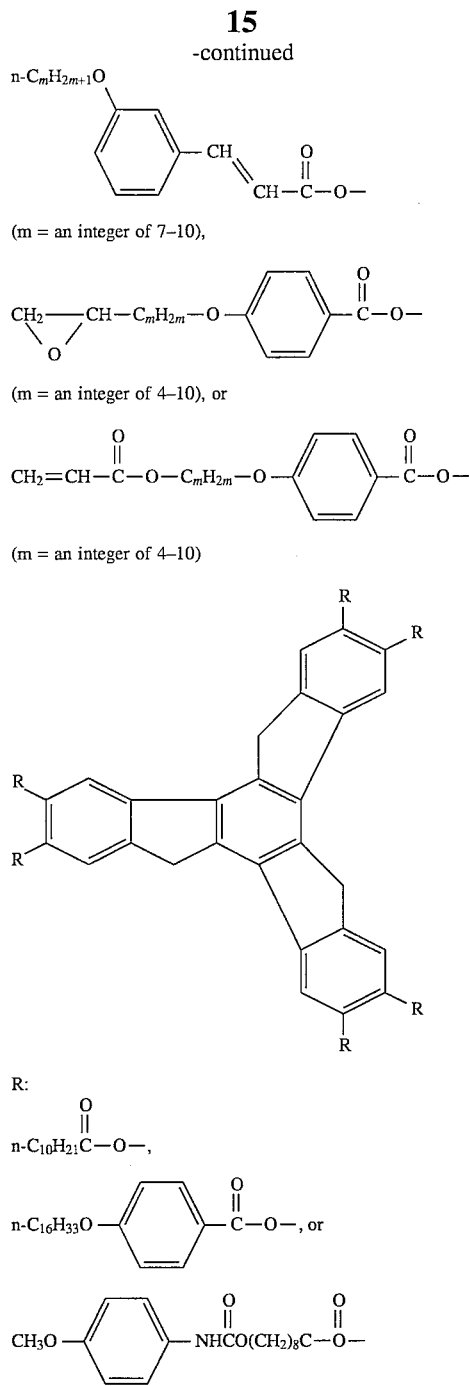

TE-9

R:

(1) n-C_{10}H_{21}C(=O)—O—, (2) n-C_{16}H_{33}O—[phenyl]—C(=O)—O—, or (3) CH_3O—[phenyl]—NHCO(CH_2)_8C(=O)—O—

TE-10

R: C_7H_{15}O—

TE-11

[anthraquinone with 4 R groups]

R:

(1) n-C_{13}H_{27}C(=O)—O— or (2) n-C_{12}H_{25}O—[phenyl]—N=CH—[phenyl]—C(=O)—O—

The optical compensatory sheet is preferably prepared by forming an orientation layer on a transparent support and forming an optically anisotropic layer on the orientation layer, as mentioned above.

The optically anisotropic layer is formed of a compound having a discotic structure unit, and the discotic structure unit has a plane inclined from a plane of the transparent support at an angle varying along a direction of depth of the optically anisotropic layer. The discotic structure unit is originated from the discotic liquid crystalline compound or polymer thereof.

The above angle (inclined angle) of the plane of discotic structure unit generally increases or decreases with increase of distance in the direction of depth from the bottom of the optically anisotropic layer. The inclined angle preferably increases with increase of the distance. Further, examples of variation of the inclined angle include continuous increase, continuous decrease, intermittent increase, intermittent decrease, variation containing continuous increase and decrease, and intermittent variation containing increase or decrease. The intermittent variation contains an area that the inclined angle does not vary in the course of the thickness direction of the layer. The inclined angle preferably totally increases or decreases in the layer, even if it does not vary in the course. The inclined angle more preferably increases totally, and especially continuously increases.

Figure 2:
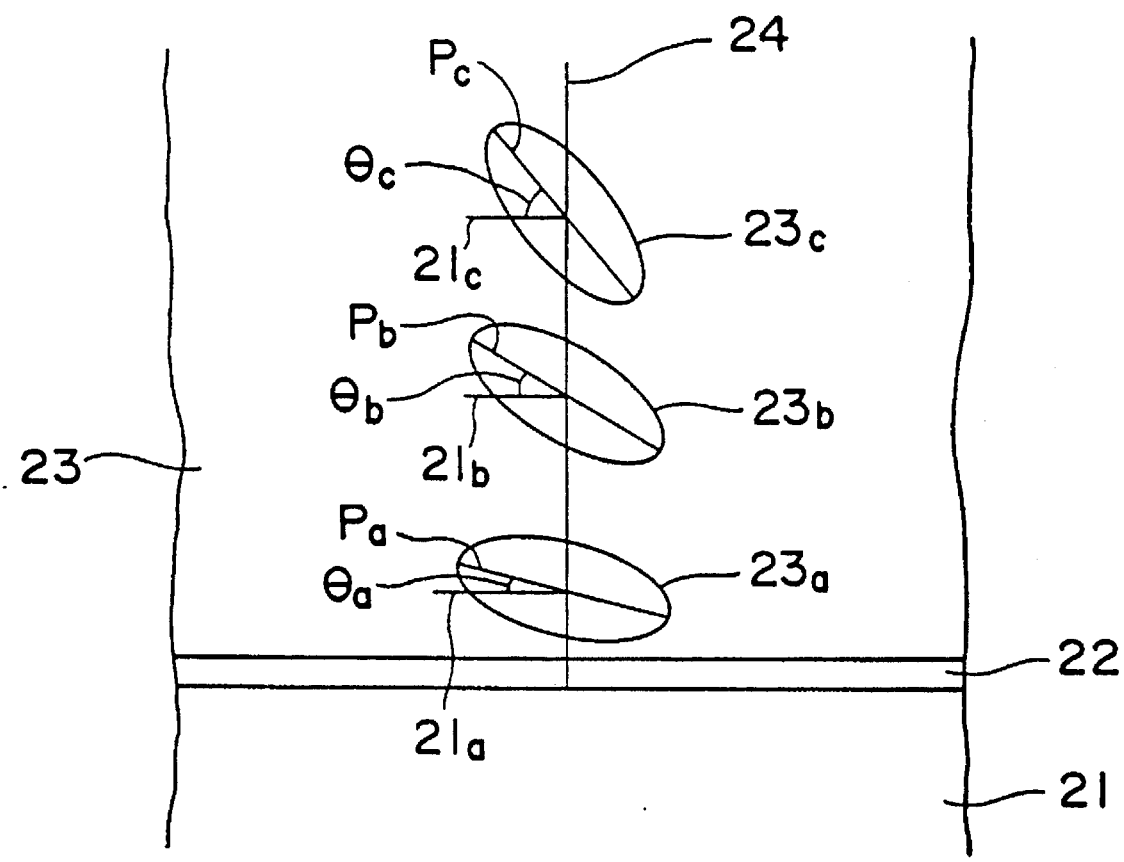
FIG. 2 is a view schematically showing the representative structure of the optically anisotropic layer of the invention.

The section view of the representative optically anisotropic layer of the invention is schematically shown in FIG. 2.

The optically anisotropic layer 23 is provided on the orientation layer 22 which is formed on the transparent support 21. The discotic liquid crystalline compounds 23a, 23b and 23c constituting the optically anisotropic layer 23 are arranged on the orientation layer 22 in such a manner that the planes of discotic structure units Pa, Pb and Pc, are inclined from planes 21a, 21b and 21c which are parallel to a plane of the transparent support 21 and the inclined angles θa, θb and θc (angle between the plane of discotic structure unit and the plane of transparent support) increase, in order, with increase of distance in a direction of depth (thickness) from a bottom of the optically anisotropic layer. The reference number 24 is the normal of the transparent support.

The discotic liquid crystalline compound is a planar molecule, and therefore has only one plane (e.g., 21a, 21b, 21c) in the molecule.

The inclined angle varies within the range of 5 to 85 degree (preferably 10 to 80 degrees). The minimum of the inclined angle is in the range of 0 to 85 degrees (preferably 5 to 40 degrees) and the maximum of the inclined angle is in the range of an angle of 5 to 90 degree (preferably 30 to 85 degrees). In FIG. 2, the inclined angle of the plane of discotic unit (e.g., θa) on the support side approximately corresponds to the minimum, and the inclined angle (e.g., θc) approximately corresponds to the maximum. Further, the difference of the minimum (e.g., the inclined angle of the discotic unit on the support side) and the maximum (e.g., the inclined angle on a surface side) preferably is in the range of 5 to 70 degrees (especially 10 to 60 degrees).

The optically anisotropic layer can be generally prepared by coating a solution of the discotic compound and other compound in a solvent on the orientation layer, dried, heating to temperature for forming a discotic nematic phase and cooling with keeping the oriented condition (discotic nematic phase). Otherwise, the layer can be prepared by coating a solution of a polymerizable discotic compound and other compound in a solvent on the orientation layer, dried, heating to temperature for forming a discotic nematic phase, polymerizing the heated layer (e.g., by radiation of UV light) and cooling.

For example, the inclined angle of the discotic unit on the support side can be generally controlled by selection of discotic compounds or materials of the orientation layer, or selection of methods for rubbing treatment. The inclined angle of the discotic unit on a surface side (air side) can be controlled by selection of discotic compounds or other compounds (e.g., plasticizer, surface active agent, polymerizable monomer and polymer) employed together with the discotic liquid crystalline compound. Further, the extent of variation of the inclined angle can be also controlled by the above selection.

As the plasticizer, surface active agent or polymerizable monomer, any compounds can be employed so long as they are compatible with the discotic compound and have properties of giving variation of the inclined angle of the discotic liquid crystalline compound or not inhibiting orientation of the discotic liquid crystalline compound. Preferred is polymerizable monomer (e.g., compounds having a vinyl, vinyloxy, acryloyl or methacryloyl group). The compound are preferably used in the amount of 1 to 50 weight % (especially 5 to 30 weight %) based on the amount of the discotic compound.

As examples of polymer, any polymers can be employed, so long as they are compatible with the discotic compound and are capable of giving variation of the inclined angle of the discotic liquid crystalline compound. Preferred are cellulose esters. Examples of the cellulose esters include acetylcellulose, acetylpropionylcellulose, hydroxypropylcellulose, and acetylbutyrylcellulose. Preferred is acetylbutyrylcellulose. The polymer are generally used in the amount of 0.1 to 10 weight % (preferably 0.1 to 8.0 weight % and especially 0.1 to 5.0 weight %) based on the amount of the discotic compound, so as not to inhibit orientation of the discotic liquid crystalline compound.

The acetylbutyrylcellulose preferably has butyl value of not less than 30% (especially 30 to 80%). The acetylbutyrylcellulose preferably has acetyl value of not less than 30% (especially 30 to 80%). The acetylbutyrylcellulose preferably has viscosity of 0.01 to 20 second which is obtained by measurement according to ASTM D-817-72.

A (color) liquid crystal display provided with the optically anisotropic layer (optical compensatory sheet) having the varying inclined angle indicated in FIG. 2 has greatly enlarged viewing angle, and almost free from reversion of black-and-white image or gradation and coloring of a displayed image.

The reason why the above optical compensatory sheet gives much increase of viewing angle is assumed as follows:

Most of TN-LCD adopt normally white mode. In the mode, a light transmittance in a black displayed portion extremely increases with increase of viewing angle, which results in rapid reduction of contrast.

Figure 3:
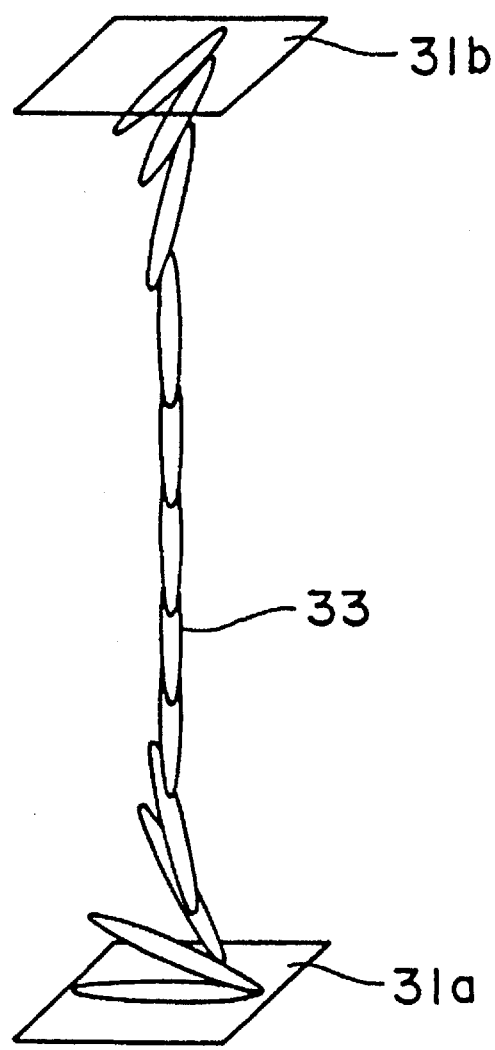
FIG. 3 is a view schematically showing the representative structure of a liquid crystal layer of a liquid crystal display.

In the black display (on application of voltage), nematic liquid crystal molecules in the liquid crystal cell are arranged as shown in FIG. 3. The liquid crystal molecule 33 which is located in the vicinity of a surface of the substrate 31, is almost parallel to a surface of the substrate 31a, and the liquid crystal molecule 33 is increasingly inclined from the surface with increase of distance from the surface and becomes perpendicular to the surface. Further, the liquid crystal molecule 33 is increasingly inclined in the opposite direction with increase of distance from the surface and finally becomes almost parallel to the surface of the substrate 31b. Hence, the liquid crystal cell in TN-LCD on the black display (on application of voltage) can be regarded as a composite which is composed of two positive anisotropic bodies having an optic axis (direction showing the minimum of Re) inclined increasingly from the surface of the cell and two positive anisotropic bodies having an optic axis parallel to the normal of the surface of the cell.

For the reason, both the variation of the inclined angle of discotic structure unit of the optically anisotropic layer and the negative birefringence compensate phase difference produced by the inclined angle of the liquid crystal molecules of the liquid crystal cell on application of voltage. Thus, the color liquid crystal display provided with the optical compensatory sheet having the optically anisotropic layer is improved in the viewing characteristics such as coloring of a displayed image and reversing of black-and-white image or gradation when the viewing direction to the liquid crystal display is greatly inclined from the normal to a surface of the screen.

Generally, the above optically anisotropic layer should have a haze of not more than 5.0, and therefore the optical compensatory sheet also has haze of not more than 5.0 because the transparent support generally has low haze. When a liquid crystal display provided with a sheet having high haze displays black image, an incident light comes partially through a black-displayed portion and therefore the light is not sufficiently cut off to give lowering of contrast in the black-displayed portion. The degree of the cutoff is further reduced when a light is incident in the direction of the normal of the sheet or near to the normal, so that the contrast is also lowered greatly in this case. Hence, the haze of the optical compensatory sheet (i.e., the optically anisotropic layer) preferably has a value of not more than 5.0%, preferably not more than 3.0% and especially not more than 1.0%.

Generally, occurrence of the haze is originated from a rough surface (e.g., unevenness or existence of flaw or mark) of the layer or the sheet, or ununiformity (e.g., existence of portions having refractive index different from that of the other portion) of the inside of the layer or the sheet. Thus, it is necessary to render the surface of the sheet even and to render the inside of the sheet (the layer) uniform, in order to obtain the sheet having low haze.

The optical compensatory sheet of the invention has a low haze because the optically anisotropic layer having even surface and uniformity of the inside of the layer can be formed. In order to further lower the haze, for example, it is preferred to form a protective layer or an adhesive layer on the optically anisotropic layer, and to select appropriately conditions for forming the optically anisotropic layer.

The even surface of the sheet or the layer can be easily obtained by means mentioned above.

As material of the protective layer mentioned above, any material can be employed. Preferred are polymers, and especially preferred are polymers which are soluble in solvents incapable of dissolving the discotic compound. Examples of the material of the protective layer include water-soluble polymers such as gelatin, methyl cellulose, alginic acid, pectin, gum arabic, pulluran, polyvinyl alcohol, polyvinyl pyrrolidone, polyacrylamide, poly(sodium vinylbenzenesulfonate), carrageenan, and polyethylene glycol.

Otherwise, an adhesive layer can be formed on the optically anisotropic layer instead of the protective layer. The adhesive layer is generally formed when the optical compensatory sheet is incorporated into a liquid crystal display. The even surface of the sheet can be obtained by coating a solution for forming the adhesive layer on the optically anisotropic layer so as to have an even surface, whereby haze of the sheet can be lowered. In the invention, it is preferred to form the adhesive layer rather than to form the protective layer, from the viewpoint of productivity.

The conditions for forming the optically anisotropic layer, are appropriately selected depending upon the composition which is based on the combination of discotic compound and the use of other compound compatible with the discotic compound. The conditions include heating temperature and time for forming a discotic nematic phase, cooling rate and time after the heating, a thickness of the layer and coating method.

Figure 4:
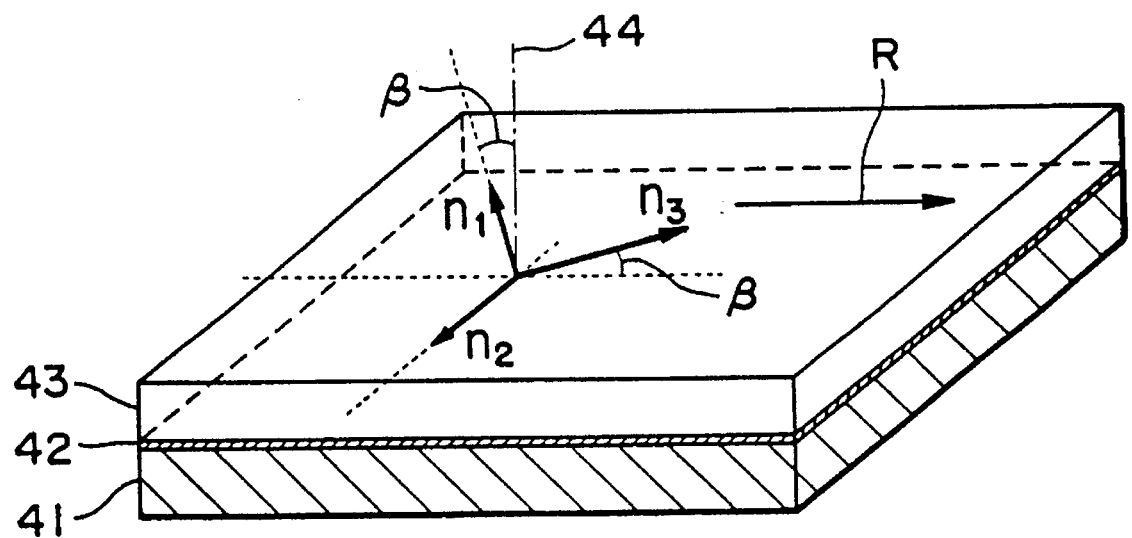
FIG. 4 is a view schematically showing the refractive indices of the three axes of the optical compensatory sheet of the invention.

The optically anisotropic layer generally has the minimum absolute retardation value in a direction inclined from the normal of the sheet and has no optic axis. The representative structure of the optical compensatory sheet containing the optically anisotropic layer of the invention is shown in FIG. 4. In FIG. 4, a transparent support 41, an orientation layer 42 and a layer of discotic liquid crystal 43 are superposed in order to constitute the optical compensatory sheet. The reference number R indicates the rubbing direction of the orientation layer. The reference numbers $n_1$, $n_2$ and $n_3$ indicate refractive indices in the three axes direction of the optical compensatory sheet, and $n_1$, $n_2$ and $n_3$ satisfy the condition of $n_1 \leq n_3 \leq n_2$, in the case that are seen in the front direction. The reference number $\beta$ is an inclined angle of the direction showing the minimum of Re from the normal 44 of the optically anisotropic layer.

In order to greatly improve the viewing angle characteristics of TN-LCD or TFT-LCD, the direction showing the minimum retardation value of the optically anisotropic layer is preferably inclined at 5 to 50 degrees from a normal line of the sheet ($\beta$ in FIG. 4) and especially 10 to 40 degrees.

Further, it is preferred that the sheet satisfies the condition of:

$$50 \leq [(n_3+n_2)/2-n_1] \times D \leq 400 \text{ (nm)}$$

in which D is a thickness of the sheet; and especially the condition of:

$$100 \leq [(n_3+n2)/2-n_1] \times D \leq 400 \text{ (nm)}$$

The solution for forming the optically anisotropic layer is prepared by dissolving the discotic compound(s) and other compounds described previously in a solvent.

Examples of solvents employable for dissolving the compound therein, include polar solvents such as N,N-dimethylformamide (DMF), dimethyl sulfoxide (DMSO) and pyridine, nonpolar solvents such as benzene and hexane, alkyl halides such as chloroform and dichloromethane, esters such as methyl acetate and butyl acetate, ketones such as acetone and methyl ethyl ketone, and ethers such tetrahydrofuran and 1,2-dimethoxyethane. Preferred are alkyl halides and ketones. The solvents may be employed singly or in combination.

Examples of the method for coating the above solution thereof includes curtain coating method, extrusion coating method, roll coating method, dip coating method, spin coating method, print coating method, coating method using slide coater and spray coating method. In the invention, vapor deposition method may be used, in the case of a mixture of only discotic compounds. In the invention, a continuously coating method is preferred. Therefore, coating methods such as curtain coating method, extrusion coating method, roll coating method and coating method using slide coater are preferred.

As mentioned above, the optical compensatory sheet can be prepared by coating the coating solution on the orientation layer, heating the coated solution to a temperature of not less than glass transition temperature (further curing the layer by irradiation of UV light, if desired), and cooling the layer to room temperature.

In the optical compensatory sheet of the invention, "Dispersion" depending on wavelength generally equals to that of the liquid crystal cell. For example, $R_{450}/R_{550}$ (Dispersion) preferably is not less than 1.0, in which $R_{450}$ represents retardation of the sheet to light of 450 nm and $R_{550}$ represents retardation of the sheet to light of 550 nm.

Figure 5:
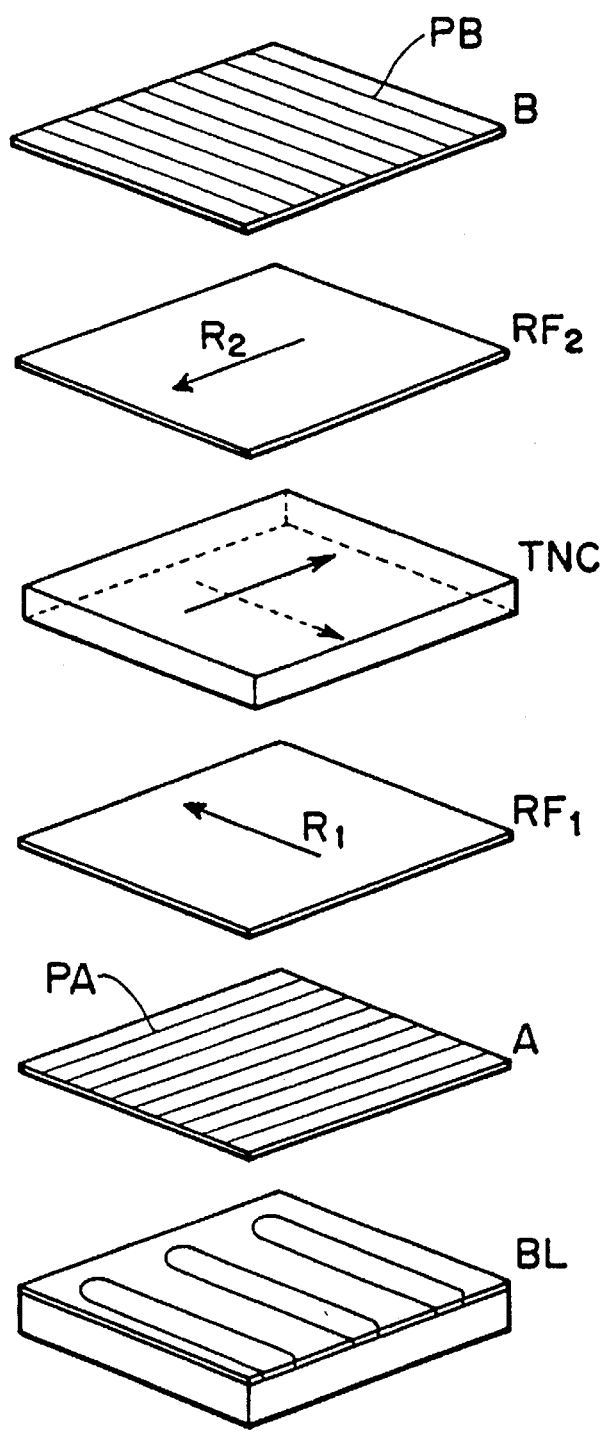
FIG. 5 is a view schematically showing the representative structure of the liquid crystal display of the invention.

The representative structure of the liquid crystal display of the invention is shown in FIG. 5. In FIG. 5, a liquid crystal cell TNC comprising a pair of substrates provided with a transparent electrode and a twist-oriented nematic liquid crystal sealed therebetween, a pair of polarizing plates A and B arranged on the both sides of the cell, the optical compensatory sheets RF1 and RF2 between the liquid crystal cell and the polarizing sheet and back light BL are assembled to constitute the liquid crystal display. The optical compensatory sheet may be arranged only on one side (i.e., use of one of RF1 and RF2). The reference number R1 is a rubbing direction of the orientation layer of the optical compensatory sheet RF1, and the reference number R2 is the rubbing direction of the orientation layer of the optical compensatory sheet RF2, in the case that are seen in the front direction. An arrow of a solid line of the liquid crystal cell TNC indicates the rubbing direction of the polarizing sheet B side substrate of TNC, and an arrow of a dotted line of the liquid crystal cell TNC indicates the rubbing direction of the polarizing sheet A side substrate of TNC. PA and PB are polarizing axes of polarizing sheets A and B, respectively.

In the liquid crystal cell of the invention, the optical compensatory sheet and the liquid crystal cell are preferably arranged in the manner described below.

Figure 6:
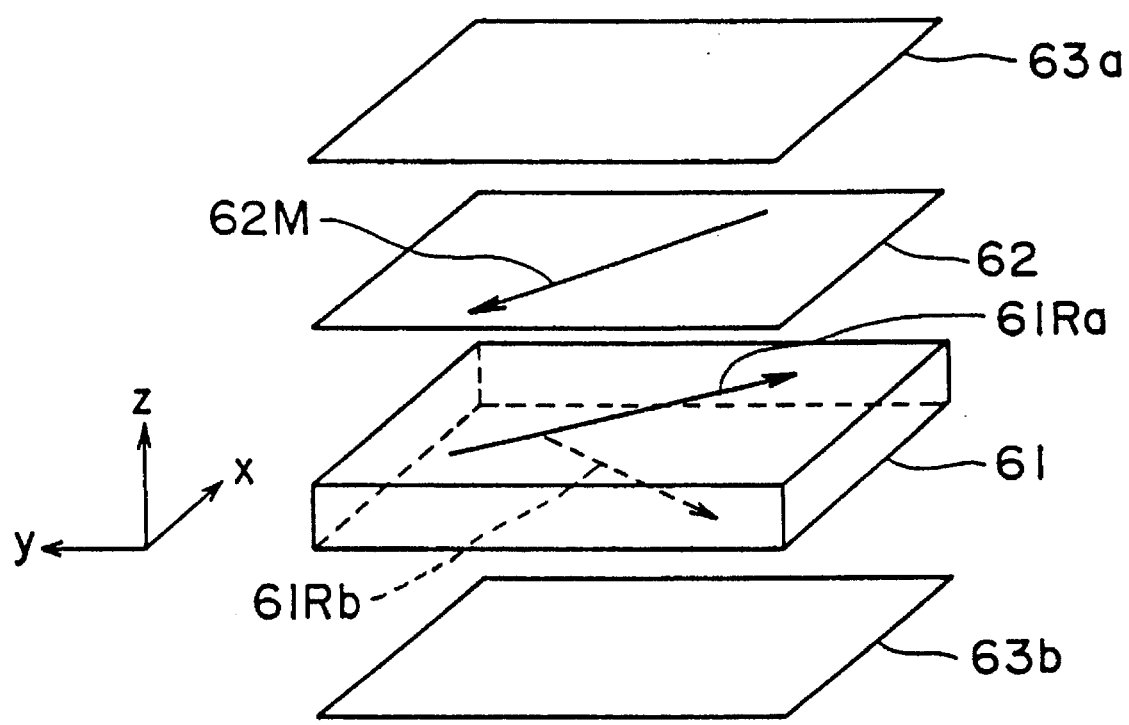
FIG. 6 is a view schematically showing relationship of the projection direction showing the minimum retardation value of the optical compensatory sheet of the invention 10 and the rubbing direction of the liquid crystal cell.

FIG. 6 shows relationship of the direction showing the minimum of retardation values and the rubbing direction of the liquid crystal cell. A pair of polarizing plates 63a and 63b are arranged on both sides of a liquid crystal cell 61, and an optical compensatory sheet 62 is arranged between the polarizing plate 63a and the liquid crystal cell 61. The sheet is generally arranged on the liquid crystal cell in such a manner that the optically anisotropic layer is in contact with a surface of the cell. The reference number 62M represents a direction given when the direction of the minimum retardation value the optical compensatory sheet 62 is orthographically projected on the cell. The direction generally corresponds to the rubbing direction of the orientation layer of the sheet. The reference number 61Ra represents a rubbing direction of a substrate on the upper side of the liquid crystal cell 61, and the reference number 61Rb represents a rubbing direction of a substrate on the lower side of the liquid crystal cell 61.

Figure 7:
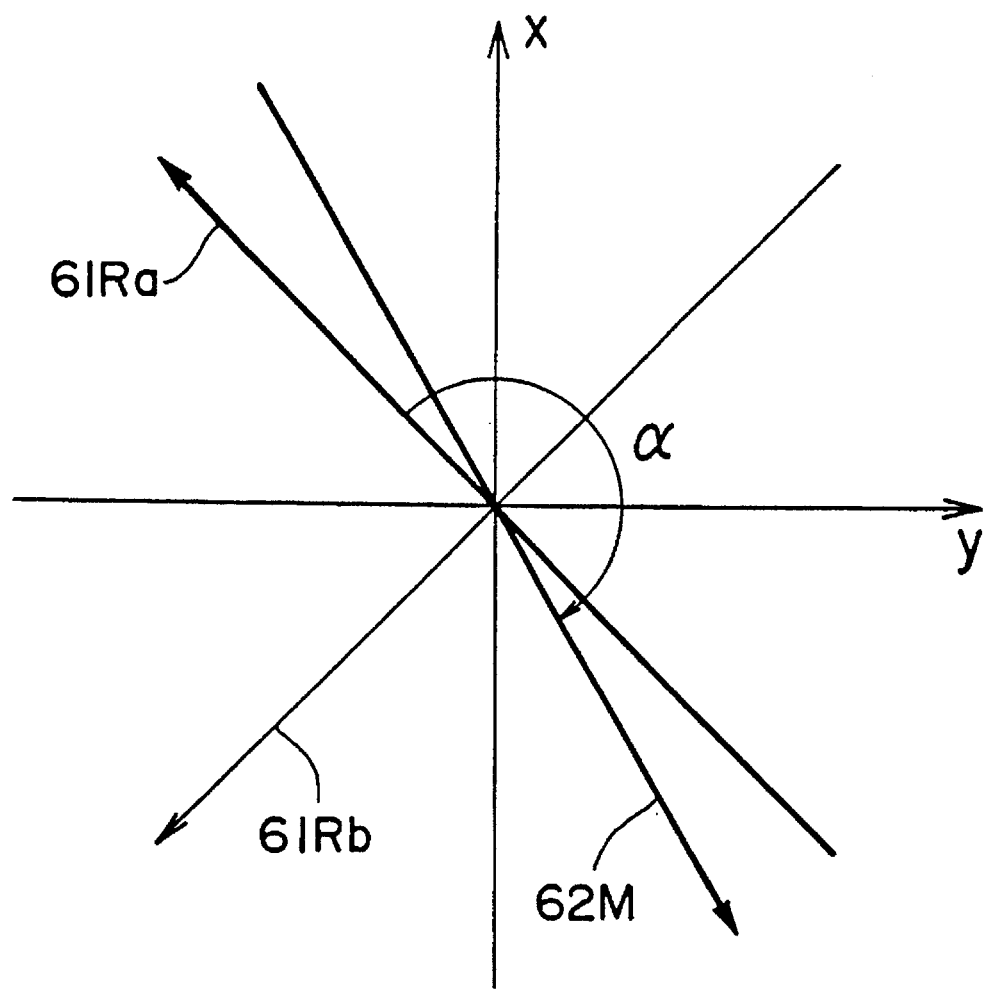
FIG. 7 is a drawing obtained when

The projected direction of the direction showing the minimum retardation value 62M generally has an angle ($\alpha$) of 90 to 270 degrees with the rubbing direction 61Ra of a substrate on the upper side of the liquid crystal cell 61. In more detail, the angle ($\alpha$) can be defined as shown in FIG. 7. FIG. 7 is a drawing obtained when FIG. 6 is viewed from a direction of z axis. In FIG. 7, 61Ra, 61Rb and 62M have the same meanings as defined in FIG. 6. The angle ($\alpha$) is an angle formed by the projected direction showing the minimum retardation value 62M and the rubbing direction 61Ra of a substrate on the upper side. The above arrangement can be applied to both cases employing one and two sheet of the optical compensatory sheet.

In the case that one sheet of the optical compensatory sheet is employed, the projected direction showing the minimum of retardation values 62M preferably is a direction of principal viewing angle (when the sheet is provided on upper side of the cell) or a direction of opposite viewing angle (when the sheet is provided on lower side of the cell). The direction of principal viewing angle means an average of twisted direction in which TN-type liquid crystal molecules in the liquid crystal cell are twisted, and therefore the direction is minus direction of x axis in the case that the TN-type liquid crystal molecules are twisted at 90 degrees in counterclockwise viewed from a direction of z axis in FIG. 6. The direction of opposite viewing angle is an opposite direction against the direction of principal viewing angle.

Figure 8:
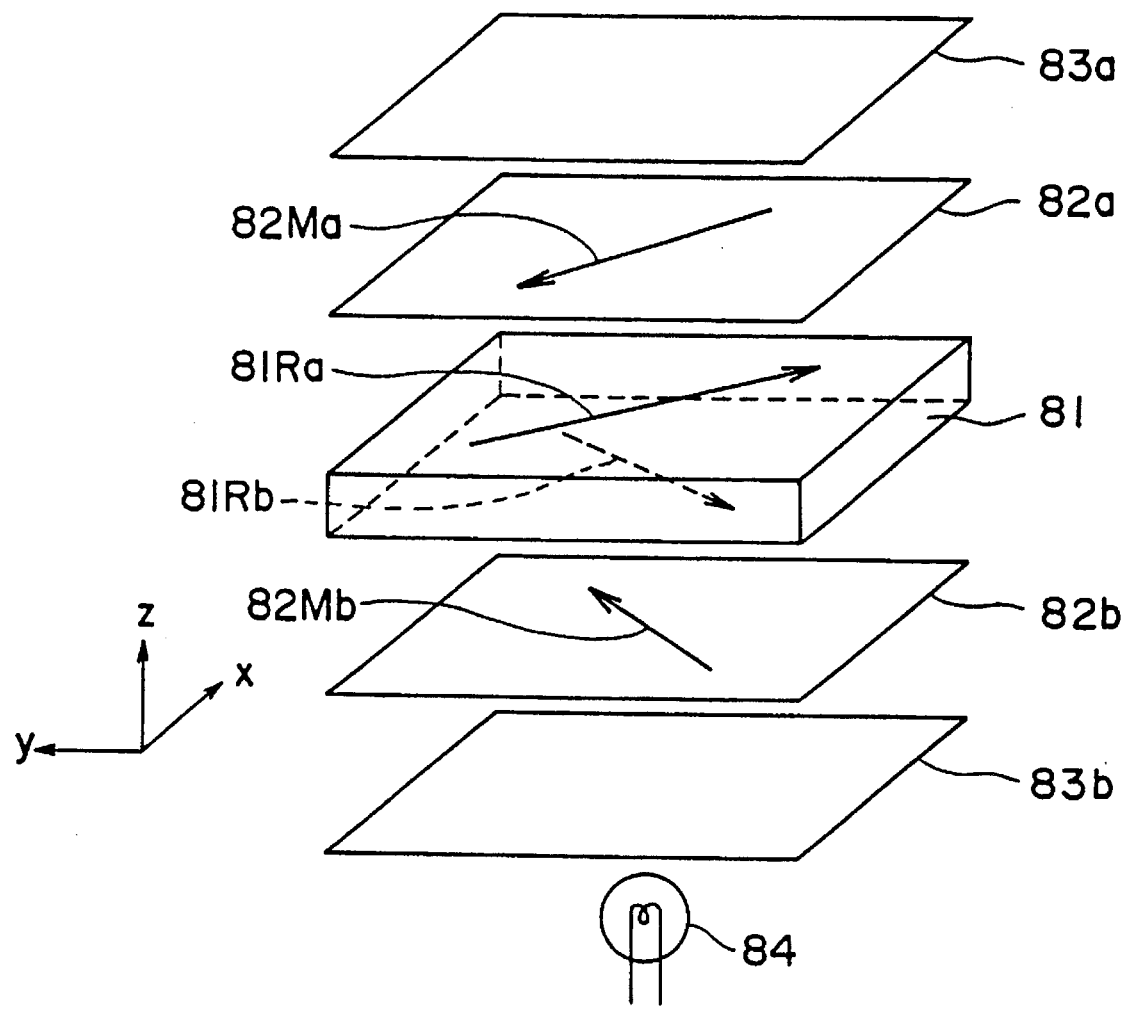
FIG. 8 is a view schematically showing relationship of the projection directions showing the minimum of retardation values of a pair of optical compensatory sheets of the invention and the rubbing direction of the liquid crystal cell when the sheets are provided both sides of the cell.
Figure 9:
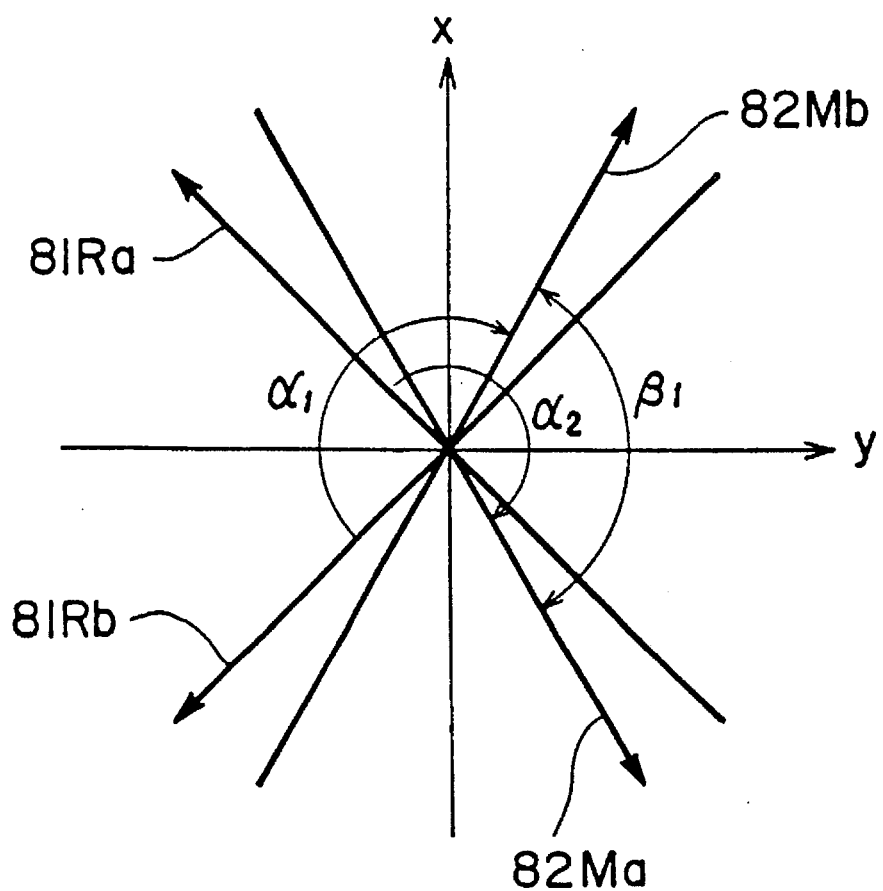
FIG. 9 is a drawing obtained when

A pair of the optical compensatory sheets are preferably provided on both sides of the liquid crystal cell as shown FIGS. 8 and 9.

In FIG. 8, a pair of polarizing plates 83a and 83b are arranged on both sides of a liquid crystal cell 81, an optical compensatory sheet 82a is arranged between the polarizing plate 83a and the liquid crystal cell 81, and an optical compensatory sheet 82b is arranged between the polarizing plate 83b and the liquid crystal cell 81. The reference numbers 82Ma and 82Mb represent directions given when the directions of the minimum retardation value of the optical compensatory sheets 82a and 82b are orthographically projected on the surfaces of the cell, respectively. The reference number 81Ra represents a rubbing direction of a substrate on the upper side of the liquid crystal cell 81, and the reference number 81Rb represents a rubbing direction of a substrate on the lower side of the liquid crystal cell 81. The reference number 84 represents a light source.

The projected direction of the direction showing the minimum of retardation values 82Ma or 82Mb preferably has an angle ($\alpha$1 or $\alpha$2) of 135 to 225 degrees with the rubbing direction 81Ra or 81Rb of a substrate on the upper side of the liquid crystal cell 81. In more detail, the angles ($\alpha$1 and $\alpha$2) can be defined as shown in FIG. 9. FIG. 9 is a drawing obtained when FIG. 8 is viewed from a direction of z axis. In FIG. 9, 81Ra, 81Rb. 82Ma and 82Mb have the same meanings as defined in FIG. 8. The angle ($\alpha$1) is an angle formed by the projected direction showing the minimum retardation value 82Ma and the rubbing direction 81Ra of a substrate on the upper side, and the angle ($\alpha$2) is an angle formed by the projected direction showing the minimum retardation value 82Mb and the rubbing direction 81Rb of a substrate on the upper side. An angle ($\beta$1) formed by the projected directions showing the minimum retardation value 82Ma and 82Mb preferable are in the range of 90 to 180 degrees.

Figure 10:
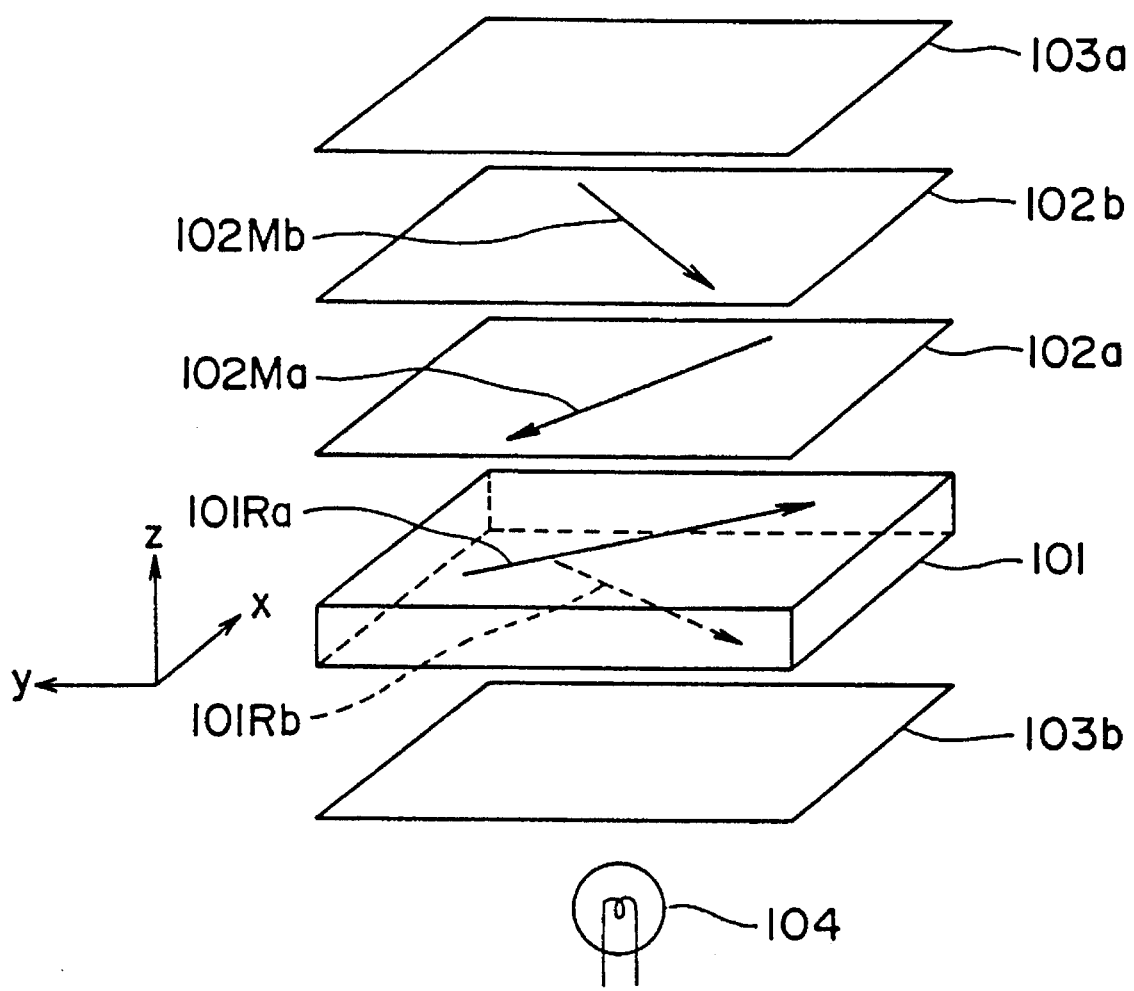
FIG. 10 is a view schematically showing relationship of the projection directions showing the minimum retardation value of two optical compensatory sheets of the invention and the rubbing direction of the liquid crystal cell when the two sheets are provided one side of the cell.
Figure 11:
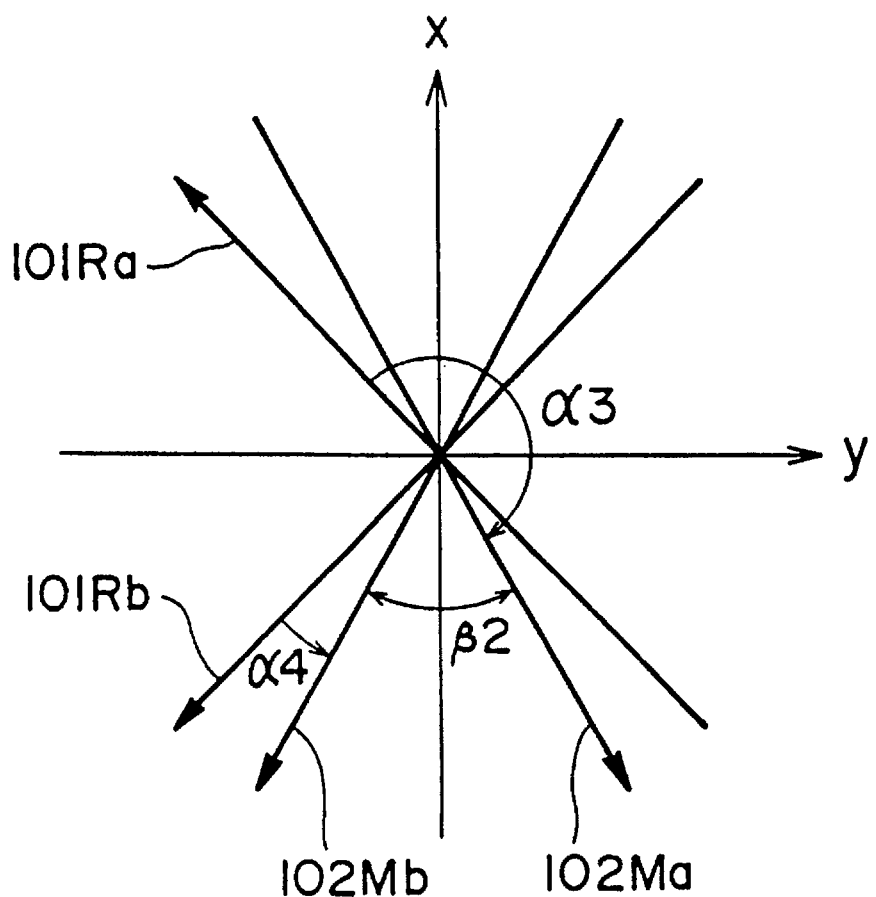
FIG. 11 is a drawing obtained when

Two sheets of the optical compensatory sheets can be provided only on one side of the liquid crystal cell as shown FIGS. 10 and 11.

In FIG. 10, a pair of polarizing plates 103a, 103b are arranged on both sides of a liquid crystal cell 101, an optical compensatory sheets 102a, 102b are arranged between the polarizing plate 103a and the liquid crystal cell 101. The reference numbers 102Ma and 102Mb represent directions given when the directions showing the minimum retardation value of the optical compensatory sheets 102a, 102b are orthographically projected on the surfaces of the cell, respectively. The reference numbers 101Ra represents a rubbing direction of a substrate on the upper side of the liquid crystal cell 101, and the reference number 101Rb represents a rubbing direction of a substrate on the lower side of the liquid crystal cell 101. The reference number 104 represents a light source.

The projected direction of the direction of the minimum retardation value 102Ma preferably have an angle ($\alpha$3) of 135 to 225 degrees with the rubbing direction 101Ra of a substrate on the upper side of the liquid crystal cell 101. In more detail, the angles ($\alpha$3 and $\alpha$4) can be defined as shown in FIG. 11. FIG. 11 is a drawing obtained when FIG. 10 is viewed from z axis direction. In FIG. 11, 101Ra, 101Rb, 102Ma and 102Mb have the same meanings as defined in FIG. 10. The angle ($\alpha$3) is an angle formed by the projected direction showing the minimum retardation value 102Ma and the rubbing direction 101Ra of a substrate on the upper side, and the angle ($\alpha$4) is an angle formed by the projected direction showing the minimum retardation value 102MID and the rubbing direction 101Rb of a substrate on the upper side. The angle ($\alpha$4) preferably is in the range of −45 to 45 degrees. An angle ($\beta$2) formed by the projected directions showing the minimum retardation values 102Ma, 102Mb preferable are in the range of 0 to 90 degrees.

The relationship of the direction showing the minimum retardation values and the rubbing direction of the liquid crystal cell as described above can be applied to the color liquid crystal display mentioned below.

Figure 12:
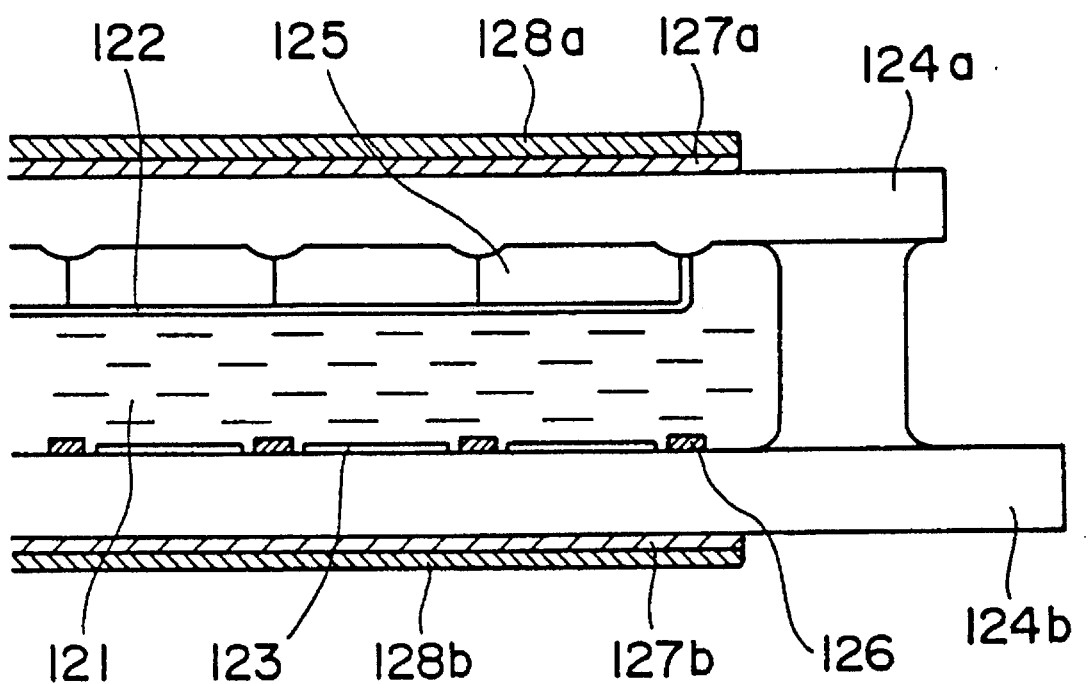
FIG. 12 is a sectional view schematically showing the representative structure of the color liquid crystal display of the invention.

Further, the representative structure of the color liquid crystal display of the invention is shown in FIG. 12. In FIG. 12, a liquid crystal cell comprising a glass substrate 124a provided with an opposite transparent electrode 122 and color filter 125, a glass substrate 124b provided with an electrode for picture element 123 and TFT (thin-film-transistor) 126, and twist-oriented nematic liquid crystal 121 sealed between the substrates, a pair of polarizing plates 128a and 128b arranged on both sides of the cell, and a pair of optical compensatory sheets 127a and 127b provided between the liquid crystal cell and the polarizing plate are assembled to constitute the color liquid crystal display. The optical compensatory sheet may be arranged only on one side (i.e., use of one of 128a and 128b).

As the color filter, any color filter can be utilized so long as it has high purity of hue, precise dimension and good heat-resistance. Examples of the color filter include dyed filter, printed filter, electro-deposited filter and pigment-dispersed filter, which are described in Color Liquid Crystal Display (Syunsuke Kobayashi, pp.172–173 and pp. 237–251, Sangaku Tosho, 1990) and Flat Panel Display 1994 (Edited by Nikkei Microdevice, pp. 216, Nikkei BP Corporation). The dyed filter can be, for example, prepared by adding dichromate to a substrate such as gelatin, casein or polyvinyl alcohol to give the substrate photosensitive property, forming a pattern on the photosensitive substrate by photolithography and dyeing.

Preferred examples of the twist-oriented nematic liquid crystals include nematic liquid crystals described in Handbook of Liquid Crystal Device (Edited by No. 142 Commission of Japan Society for the Promotion of Science, pp. 107–213, Nikkan Kogyo Newspaper Office).

The long axis of the nematic liquid crystal is twisted at approx. 90 degrees and oriented between both substrates of the liquid crystal cell. Therefore, a linearly polarized light incident upon the liquid crystal cell is passed through the cell to become a light having polarized direction changed by 90 degrees due to optical rotatory power of the cell, when no voltage is applied to the cell. When high voltage of not less than threshold value is applied to the cell, the direction of the long axis of the nematic liquid crystal is changed to that of the applied voltage and the long axis is arranged perpendicular to the surface of substrate (electrode), whereby the optical rotatory power disappears.

To obtain an effective (in high contrast) response by the optical rotatory power, the twisted angle preferably is in the range of 70 to 100 degrees, especially 80 to 90 degrees.

Further, it is preferred that the liquid crystal molecule is pre-tilted to give a pre-tilted angle in order to depress occurrence of disclination in the condition of the application of voltage. The pre-tilted angle preferably is not more than 5 degrees, especially in the range of 2 to 4 degrees. Details of the twisted-angel and pre-tilted angel are shown in Application Edition of Liquid Crystal (Mistuji Okano and Syunsuke Kobayashi, pp. 16–28, Baifukan).

The product ($\Delta$n.d) of refractive index anisotropy (birefringence) of the liquid crystal cell ($\Delta$n) and a thickness of the liquid crystal layer of the cell (d) preferably is in the range of 0.3 to 1.0 μm, especially 0.3 to 0.6 μm. Details of the product ($\Delta$n.d) are described in Handbook of Liquid Crystal Device (Edited by No. 142 Commission of Japan Society for the Promotion of Science, pp. 329–337, Nikkan Kogyo Newspaper Office).

Signals utilized in the color liquid crystal display of the invention, is preferably composed of alternating current of 5 to 100 Hz and voltage of not more than 20 V (especially not more than 8 V). In normally white mode, bright display is usually conducted in 0 to 1.5 V, medium contrast display is usually done in 1.5 to 3.0 V, and dark display is usually conducted in 3.0 V and more. Details of the signals are described in Handbook of Liquid Crystal Device (Edited by No. 142 Commission of Japan Society for the Promotion of Science, pp. 387–465, Nikkan Kogyo Newspaper Office) and Application Edition of Liquid Crystal (Mistuji Okano and Syunsuke Kobayashi, pp. 85–105, Baifukan).

Materials for the polarizing plate employable in the color liquid crystal display and the liquid crystal display previously described are not restricted and any material can be employed. Generally, a polarizing plate is composed of a polarizing film and a protective film provided thereon, and the polarizing film is, for example, prepared by treating a hydrophilic polymer such as a stretched polyvinyl alcohol film with iodine or dichloric dye. The protective film is generally prepared by stretching triacetylcellulose. The film generally has retardation of 0 to 200 nm, preferably 0 to 100 nm. The retardation is defined by $\{(n_x+n_y)/2-n_z\} \times d$ which is described in definition of that of the transparent support.

Examples of the present invention and comparison examples are given below, but these examples by no means restrict the invention.

EXAMPLE 1

Preparation of optical compensatory sheet

On a triacetyl cellulose film having a thickness of 120 μm (available from Fuji Photo Film Co., Ltd.), a thin layer of gelatin (0.1 μm) was formed. A coating solution containing polyvinyl alcohol having long chain alkyl groups (MP-203, produced by Kuraray Co., Ltd.) was coated on the gelatin layer, dried using warm air (80° C.) to form a layer of the polyvinyl alcohol and rubbing a surface of the layer to form an orientation layer.

"$|n_x-n_y| \times d$" and "$\{(n_x+n_y)/2-n_z\} \times d$" of the triacetyl cellulose film was determined, in which $n_x$ and $n_y$ is main refractictive indices within the film, $n_z$ is a main refractive index in a thickness direction, and d is a thickness of the film (FIG. 1).

The thickness was measured with a micrometer, and Re values in various directions were measured by an ellipsometer (AEP-100, available from Shimadzu Seisakusho, Ltd.) to determine the above "$|n_x-n_y| \times d$" and "$\{(n_x+n_y)/2-n_z\} \times d$". "$|n_x-n_y| \times d$" was 3 nm and "$\{(n_x+n_y)/2-n_z\} \times d$" was 60 nm. Thus, the film had almost negative uniaxial property and the optic axis almost was coincident with the direction of the normal of the film.

On the orientation layer, a coating solution obtained by dissolving a mixture of 1.6 g of the discotic liquid crystalline compound TE-8-(8, m=4) (compound previously mentioned), 0.4 g of phenoxy diethyleneglycol acrylate (M101, available from Toagosei Chemical Industry Co., Ltd.), 0.05 g of acetylbutyrylcellulose (CAB531-1, available from Eastman Chemical Co.) and, 0.01 g of photopolymerization initiator (Irgacure-907, available from Ciba-Geigy) in 3.65 g of methyl ethyl ketone was coated using a wirebar coater (#4 bar). The coated film was fixed in a metal frame, and heated in a thermostat at a temperature of 130° C. for 3 minutes to orient the discotic liquid crystalline compound of the coated layer, and cooled to room temperature to form an optically anisotropic layer having a thickness of 1.8 μm. Thus, an optical compensatory sheet (OCSA) was obtained.

The resultant optical compensatory sheet (OCS-A) was cut in the rubbing direction along depth of the sheet using a microtome to prepare an extremely thin film (sample). The sample was allowed to stand in an atmosphere of $OsO_4$ for 48 hours to dye. The dyed sample was observed by a transmission electron microscope (TEM) and a photograph of the dyed sample was taken. In the dyed sample, acryloyl groups of the discotic liquid crystalline compound TE-8-(8, m=4) of the optically anisotropic layer was dyed and the acryloyl groups came out on the photo.

From the photo, it was confirmed that the discotic liquid crystalline compound of the optically anisotropic layer was inclined from the transparent support, while the inclined angle continuously increased from approx. 5 degrees to 65 degrees with increase of distance in the direction of depth from the bottom of the optically anisotropic layer.

EXAMPLE 2

Preparation of optical compensatory sheet

On a triacetyl cellulose film having a thickness of 120 μm (available from Fuji Photo Film Co., Ltd.), a thin layer of gelatin (0.1 μm) was formed. A coating solution containing polyvinyl alcohol having long chain alkyl groups (MP-203, produced by Kuraray Co., Ltd.) was coated on the gelatin layer, dried using warm air (40° C.) to form a layer of the polyvinyl alcohol and rubbing a surface of the layer to form an orientation layer.

"|nx−ny|×d" was 3 nm and "{(nx+ny)/2−nz}×d" was 70 nm, which were determined in the same manner as Example 1. Thus, the film had almost negative uniaxial property and the optic axis almost was coincident with the direction of the normal of the film.

On the orientation layer, a coating solution obtained by dissolving a mixture of 1.6 g of the discotic liquid crystalline compound TE-8-(8, m=4) (compound previously mentioned), 0.4 g of phenoxy diethyleneglycol acrylate (M101, available from Toagosei Chemical Industry Co., Ltd.), 0.05 g of acetylbutyrylcellulose (CAB531-1, available from Eastman Chemical Co.) and 0.01 g of photopolymerization initiator (Irgacure-907, available from Ciba-Geigy) in 3.65 g of methyl ethyl ketone was coated using a wirebar coater (#4 bar). The coated film was fixed in a metal frame, and heated in a thermostat at a temperature of 120° C. for 3 minutes to orient the discotic liquid crystalline compound of the coated layer. Subsequently, UV light was irradiated on the coated layer under heating at 120° C. using a high-pressure mercury lamp for one minute and cooled to room temperature to form an optically anisotropic layer having a thickness of 1.8 μm. Thus, an optical compensatory sheet (OCS-B) was obtained.

As to the optical compensatory sheet (OCS-B), the thickness was measured with a micrometer, and Re values in various directions were measured along the rubbing direction by an ellipsometer (AEP-100, available from Shimadzu Seisakusho, Ltd.) along the rubbing direction. After the optically anisotropic layer was removed from the sheet (OCS-B), Re values in various directions of the removed sheet were measured as above.

Figure 13:
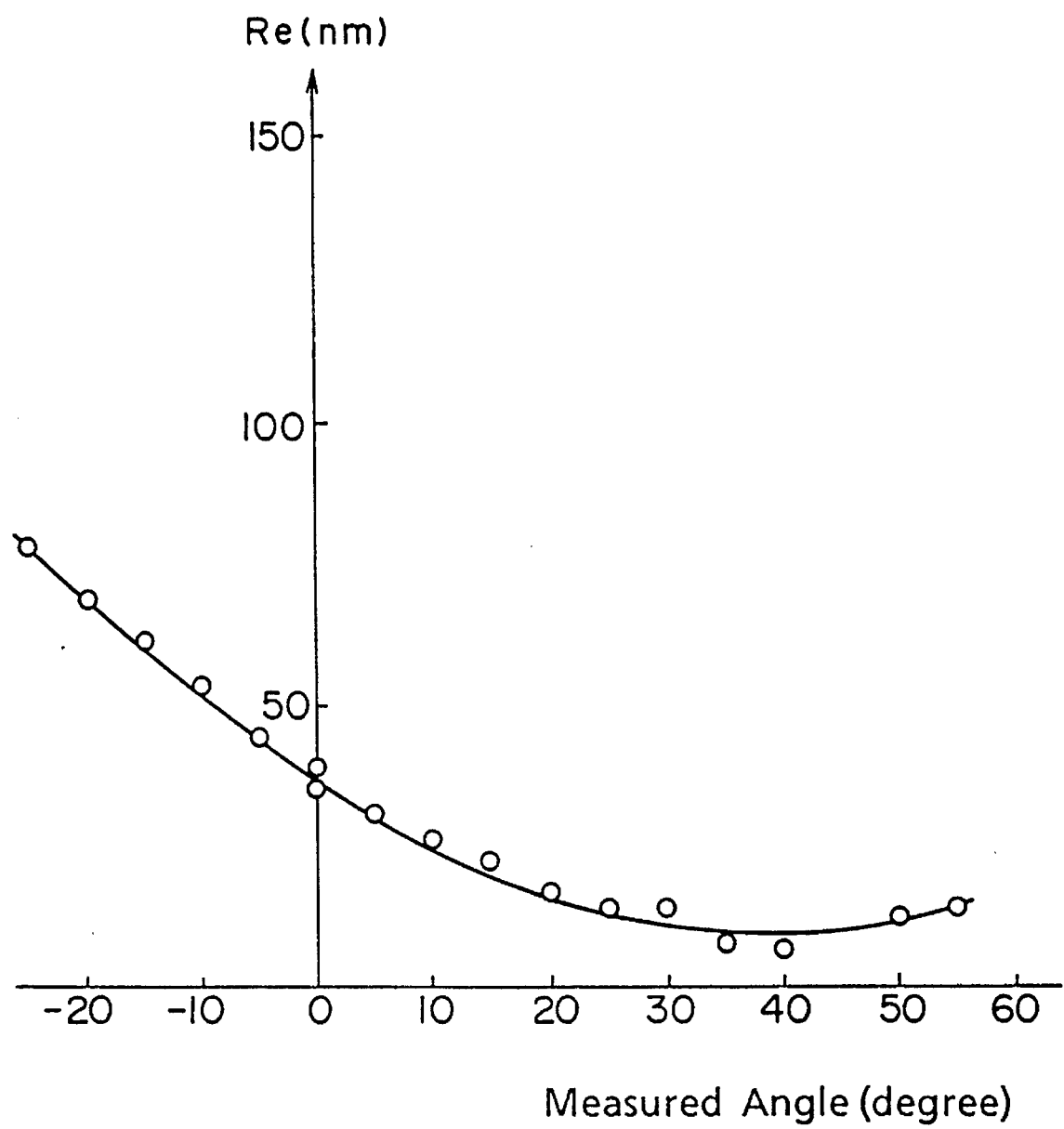
FIG. 13 is a graph showing relationship of Re and viewing angle of the optically anisotropic layer of the sheet (OCS-B) obtained in Example 2.

From the above data, Re and measured angle (viewing angle) of the optically anisotropic layer of the sheet (OCS-B) indicated the relationship shown in FIG. 13. The result of the FIG. 13 showed that the layer had a negative birefringence, the plane of the discotic structure unit was inclined from the normal of the transparent support, and the inclined angle of the plane increased from 20 degrees to 50 degrees with increase of distance in a direction of depth from the support side of the optically anisotropic layer.

EXAMPLE 3

Preparation of optical compensatory sheet

On a triacetyl cellulose film having a thickness of 100 μm (available from Fuji Photo Film Co., Ltd.), a thin layer of gelatin (0.1 μm) was formed. A coating solution containing polyvinyl alcohol having long chain alkyl groups (MP-203, produced by Kuraray Co., Ltd.) was coated on the gelatin layer, dried using warm air (80° C.) to form a layer of the polyvinyl alcohol and rubbing a surface of the layer to form an orientation layer.

"|nx−ny|×d" was 6 nm and "{(nx+ny)/2−nz}×d" was 40 nm, which were determined in the same manner as Example 1. Thus, the film had almost negative uniaxial property and the optic axis almost coincided with the direction of the normal of the film.

On the orientation layer, a coating solution obtained by dissolving a mixture of 1.8 g of the discotic liquid crystalline compound TE-8-(8, m=4) (compound previously mentioned), 0.2 g of ethylene glycol modified-trimethylolpropane triacrylate (V#360, available from Osaka Organic Chemical Industry Co., Ltd.), 0.04 g of acetylbutyrylcellulose (CAB551-0.2, available from Eastman Chemical Co.), 0.06 g of photopolymerization initiator (Irgacure-907, available from Ciba-Geigy) and 0.02 g of sensitizer (Kayacure-DETX, available from Nippon Kayaku Co., Ltd.) in 3.43 g of methyl ethyl ketone was coated using a wire-bar coater (#3 bar). The coated film was fixed in a metal frame, and heated in a thermostat at a temperature of 120° C. for 3 minutes to orient the discotic liquid crystalline compound of the coated layer. Subsequently, UV light was irradiated on the coated layer under heating at 120° C. using a high-pressure mercury lamp (120 W/cm) for one second and cooled to room temperature to form an optically anisotropic layer having a thickness of 1.8 μm. Thus, an optical compensatory sheet (OCS-C) was obtained.

As to the optical compensatory sheet (OCS-C), the thickness and Re values in various directions were measured by an ellipsometer (AEP-100, available from Shimadzu Seisakusho, Ltd.) in the same manner as Example 2.

From the above data, it was confirmed that the layer had negative birefringence, the plane of the discotic structure unit was inclined from the normal of the transparent support, and the inclined angle of the plane increased from 20 degrees to 70 degrees with increase of distance in a thickness direction from the support side of the optically anisotropic layer.

EXAMPLE 4

Preparation of optical compensatory sheet

On a triacetyl cellulose film having a thickness of 110 μm (available from Fuji Photo Film Co., Ltd.), a thin layer of gelatin (0.1 μm) was formed. A coating solution containing polyvinyl alcohol having long chain alkyl groups (MP-203, produced by Kuraray Co., Ltd.) was coated on the gelatin layer, dried using warm air (40° C.) to form a layer of the polyvinyl alcohol and rubbing a surface of the layer to form an orientation layer.

"|nx−ny|×d" was 3 nm and "{(nx+ny)/2−nz}×d" was 50 nm, which were determined in the same manner as Example 1. Thus, the film had almost negative uniaxial property and the optic axis almost coincided with the direction of the normal of the film.

On the orientation layer, a coating solution obtained by dissolving a mixture of 1.75 g of the discotic liquid crystalline compound TE-8-(8, m=4) (compound previously mentioned), 0.25 g of α-acrolein-ω-phenoxy-polyoxyethylene (AMP60G, available from Shin Nakamura Chemical Industry Co., Ltd.), 0.05 g of acetylbutyrylcellulose (CAB500-5, available from Eastman Chemical Co.) and 0.01 g of photopolymerization initiator (Irgacure-907, available from Ciba-Geigy) in 3.43 g of methyl ethyl ketone was coated using a wire-bar coater (#3 bar). The coated film was fixed in a metal frame, and heated in a thermostat at a temperature of 120° C. for 3 minutes to orient the discotic liquid crystalline compound of the coated layer. Subsequently, UV light was irradiated on the coated layer under heating at 120° C. using a high-pressure mercury lamp (120 W/cm) for one second and cooled to room temperature to form an optically anisotropic layer having a thickness of 1.8 μm. Thus, an optical compensatory sheet (OCS-D) was obtained.

As to the optical compensatory sheet (OCS-D), the thickness and Re values in various directions were measured by an ellipsometer (AEP-100, available from Shimadzu Seisakusho, Ltd.) in the same manner as Example 2.

From the above data, it was confirmed that the layer had negative birefringence, the plane of the discotic structure unit was inclined from the normal of the transparent support, and the inclined angle of the plane was reduced from 20 degrees to 40 degrees with increase of distance in a thickness direction from the support side of the optically anisotropic layer.

EXAMPLE 5

Preparation of optical compensatory sheet

On a triacetyl cellulose film having a thickness of 100 μm (available from Fuji Photo Film Co., Ltd.), a thin layer of gelatin (0.1 μm) was formed. A coating solution containing polyvinyl alcohol having long chain alkyl groups (MP-203, produced by Kuraray Co., Ltd.) was coated on the gelatin layer, dried using warm air (40° C.) to form a layer of the polyvinyl alcohol and rubbing a surface of the layer to form an orientation layer.

"$|nx-ny|\times d$" was 3 nm and "$\{(nx+ny)/2-nz\}\times d$" was 40 nm, which were determined in the same manner as Example 1. Thus, the film had almost negative uniaxial property and the optic axis almost coincided with the direction of the normal of the film.

On the orientation layer, a coating solution obtained by dissolving a mixture of 1.6 g of the discotic liquid crystalline compound TE-8-(8, m=4) (compounds previously mentioned), 0.4 g of phenoxy diethyleneglycol acrylate (M101, available from Toagosei Chemical Industry Co., Ltd.), 0.05 g of acetylbutyrylcellulose (CAB531-1, available from Eastman Chemical Co.) and 0.01 g of photopolymerization initiator (Irgacure-907, available from Ciba-Geigy) in 3.65 g of methyl ethyl ketone was coated using a wirebar coater (#4 bar). The coated film was fixed in a metal frame, and heated in a thermostat at a temperature of 120° C. for 3 minutes to orient the discotic liquid crystalline compound of the coated layer. Subsequently, UV light was irradiated on the coated layer under heating at 120° C. using a high-pressure mercury lamp for one minute and cooled to room temperature to form an optically anisotropic layer having a thickness of 1.0 μm. Thus, an optical compensatory sheet (OCS-F) was obtained.

As to the optical compensatory sheet (OCS-F), the thickness and Re values in various directions were measured by an ellipsometer (AEP-100, available from Shimadzu Seisakusho, Ltd.) in the same manner as Example 2.

From the above data, the direction showing the minimum of Re values was a direction inclined at 33 degrees from the normal of the sheet, and the minimum was 10 nm. Moreover, Re in a direction of thickness (depth) was 110 nm.

Furthermore, from the above data, it was confirmed that the layer had a negative birefringence, the plane of the discotic structure unit was inclined from the normal of the transparent support, and the inclined angle of the plane was reduced from 20 degrees to 50 degrees with increase of distance in a thickness direction from the support side of the optically anisotropic layer.

COMPARISON EXAMPLE 1

Preparation of optical compensatory sheet

On a orientation layer of a triacetyl cellulose film prepared in the same manner as Example 1, a coating solution of 10 weight % obtained by dissolving a mixture of the discotic liquid crystalline compound TE-8-(3) (compound previously mentioned) in methyl ethyl ketone was coated at 2,000 rpm using a spin-coater. Thereafter, the coated layer was heated to 180° C., subjected to heat treatment, and cooled to room temperature to form an optically anisotropic layer having a thickness of 1.0 μm. Thus, an optical compensatory sheet (OCS-G) was obtained.

As to the optical compensatory sheet (OCS-G), the thickness and Re values in various directions were measured by an ellipsometer (AEP-100, available from Shimadzu Seisakusho, Ltd.) in the same manner as Example 2.

From the above data, it was confirmed that the layer had negative birefringence, and the plane of the discotic structure unit was inclined from the normal of the transparent support.

COMPARISON EXAMPLE 2

Preparation of optical compensatory sheet

On a orientation layer of a triacetyl cellulose film prepared in the same manner as Example 3, a coating solution of 10 weight % obtained by dissolving a mixture of the discotic liquid crystalline compound TE-6 (compound previously mentioned) in methyl ethyl ketone was coated at 2,000 rpm using a spin-coater. Thereafter, the coated layer was heated to 170° C., subjected to heat treatment, and cooled to room temperature to form an optically anisotropic layer having a thickness of 1.0 μm. Thus, an optical compensatory sheet (OCS-H) was obtained.

As to the optical compensatory sheet (OCS-H), the thickness and Re values in various directions were measured by an ellipsometer (AEP-100, available from Shimadzu Seisakusho, Ltd.) in the same manner as Example 2.

From the above data, it was confirmed that the layer had negative birefringence, and the plane of the discotic structure unit was inclined from the normal of the transparent support.

Evaluation of optical compensatory sheet

As for the optical compensatory sheets obtained in Examples 1 to 4 and Comparison Examples 1 and 2, the optical characteristics were evaluated in the manners described below.

(1) Variation of angle of the plane of discotic compound of the optically anisotropic layer and angle (β) of direction showing the minimum retardation value of the minimum of the optically anisotropic layer, were determined in the above manner.

(2) Haze

Determination of the haze was carried out according to ASTN-D 1003-52.

As to each of the obtained sheets, the haze was determined using a haze measuring apparatus (NDH-1001DP, available from Nippon Densyoku Kogyo Co., Ltd.).

(3) Size of domain

A size of domain formed in the optically anisotropic layer was measured by a polarization micrometer.

The obtained results were set forth in Table 1.

TABLE 1

| Example | Sheet No. | Haze (%) | *Optic Axis | Variation of angle of plane | Angle (β) **Minimum Direction (degree) | Domain Size (μm) |
|---|---|---|---|---|---|---|
| Ex. 1 | OCS-A | 1.0 | None | 5–65 | 30 | ***-- |
| Ex. 2 | OCS-B | 1.0 | None | 20–50 | 35 | -- |
| Ex. 3 | OCS-C | 0.3 | None | 20–70 | 40 | -- |
| Ex. 4 | OCS-D | 0.3 | None | 20–40 | 25 | -- |
| Ex. 5 | OCS-F | -- | None | 20–50 | 33 | -- |
| Co. Ex. 1 | OCS-G | 8.1 | Observed | -- | 37 | 10 |
| Co. Ex. 2 | OCS-H | 7.9 | Observed | -- | 38 | -- |

Note:
*: Direction showing Re of zero
**: Direction showing retardation value of the minimum.
***: "--" indicates condition of mono-domain.

EXAMPLES 6–8 and COMPARISON EXAMPLES 3–4

Preparation of liquid crystal display

Two optical compensatory sheets obtained Example 2 were attached to one side of TN-type liquid crystal cell that the clearance between the substrates of the liquid crystal cell was 4.5 μm, and the twisted angle of the liquid crystal was 90 degrees, as shown in FIG. 10. In the above attaching procedure, the projected direction (rubbing direction) showing the minimum of retardation values (102 Ma of FIG. 11) of the optical compensatory sheet on the lower side was so arranged as to form an angle (α3) of 180 degrees with the rubbing direction (101Ra of FIG. 11) of a substrate on the upper side, and the projected direction (rubbing direction) showing the minimum of retardation values (102 Mb of FIG. 11) of the optical compensatory sheet on the upper side was so arranged as to form an angle (α4) of 0 degree with the rubbing direction (101Rb of FIG. 11) of a substrate on the lower side. Further, two polarizing plates were arranged in such a manner that two polarizing axes intersected at right angles. Furthermore, a protective film provided on the polarizing plate was TAC film having retardation 40 nm (which is defined by {(nx+ny)/2−nz}×d).

The obtained TN-LCD is normally white mode type and has a structure shown in FIG. 5.

The optical compensatory sheets obtained Examples 3–4 and Comparison Examples 1–2 were also attached to both sides of TN-type liquid crystal cell in the same manner as above.

Further, the TN-LCD having no optical compensatory sheet (Comparison Example 5) was evaluated in the same manner as above.

Evaluation of liquid crystal display

To the TN-LCD, a rectangular wave of 55 Hz was applied at a voltage of 0 to 5 V, and transmittances (T) were measured by varying the viewing angle using a spectrophotometer (LCD-5000, available from Otsuka Electronics Co., Ltd.). From the measured data, the angle against the normal at which the contrast ($T_{0V}/T_{5V}$) on a black-and-white display showed 10 was defined as viewing angle and the viewing angles in a height (upper-lower) direction and a width (left-right) direction of the TN-LCD were determined.

The obtained result is set forth in Table 2.

TABLE 2

| | | | Viewing Angle | |
|---|---|---|---|---|
| Example | Sheet No. | Contrast from Front side | upper-lower (degree) | left-right (degree) |
| Ex. 6 | OCS-B | ≧100 | 130 | 125 |
| Ex. 7 | OCS-C | ≧100 | 130 | 130 |
| Ex. 8 | OCS-D | ≧100 | 120 | 120 |
| Co. Ex. 3 | OCS-G | 50 | 64 | 70 |
| Co. Ex. 4 | OCS-H | 59 | 61 | 66 |
| Co. Ex. 5 | None | ≧100 | 61 | 95 |

As is apparent from results of Tables 1 and 2, the liquid crystal displays (Examples 6–8) provided with the optical compensatory sheets (Examples 2–4) having increasing inclined angle of the plane of the discotic liquid crystalline compound showed greatly enlarged viewing angle and high contrast from front side.

EXAMPLE 9

Preparation of liquid crystal display

The optical compensatory sheet obtained Example 6 was attached to both sides of TN-type liquid crystal cell that the clearance between the substrates of the liquid crystal cell was 4.5 μm, and the twisted angle of the nematic liquid crystal (Δn: 0.8) was 90 degrees, as shown in FIG. 8. In the above attaching procedure, the projected direction showing the minimum of retardation values (82 Ma of FIG. 9) of the optical compensatory sheet on the upper side was so arranged as to form an angle (α1) of 180 degrees with the rubbing direction (81Ra of FIG. 9) of a substrate on the upper side, and the projected direction showing the minimum of retardation values (82Mb of FIG. 9) of the optical compensatory sheet on the lower side was so arranged as to form an angle (α2) of 180 degrees with the rubbing direction (81Rb of FIG. 9) of a substrate on the lower side. Further, two polarizing plates were arranged in such a manner that two polarizing axes intersected at right angles.

Evaluation of liquid crystal display

Figure 14:
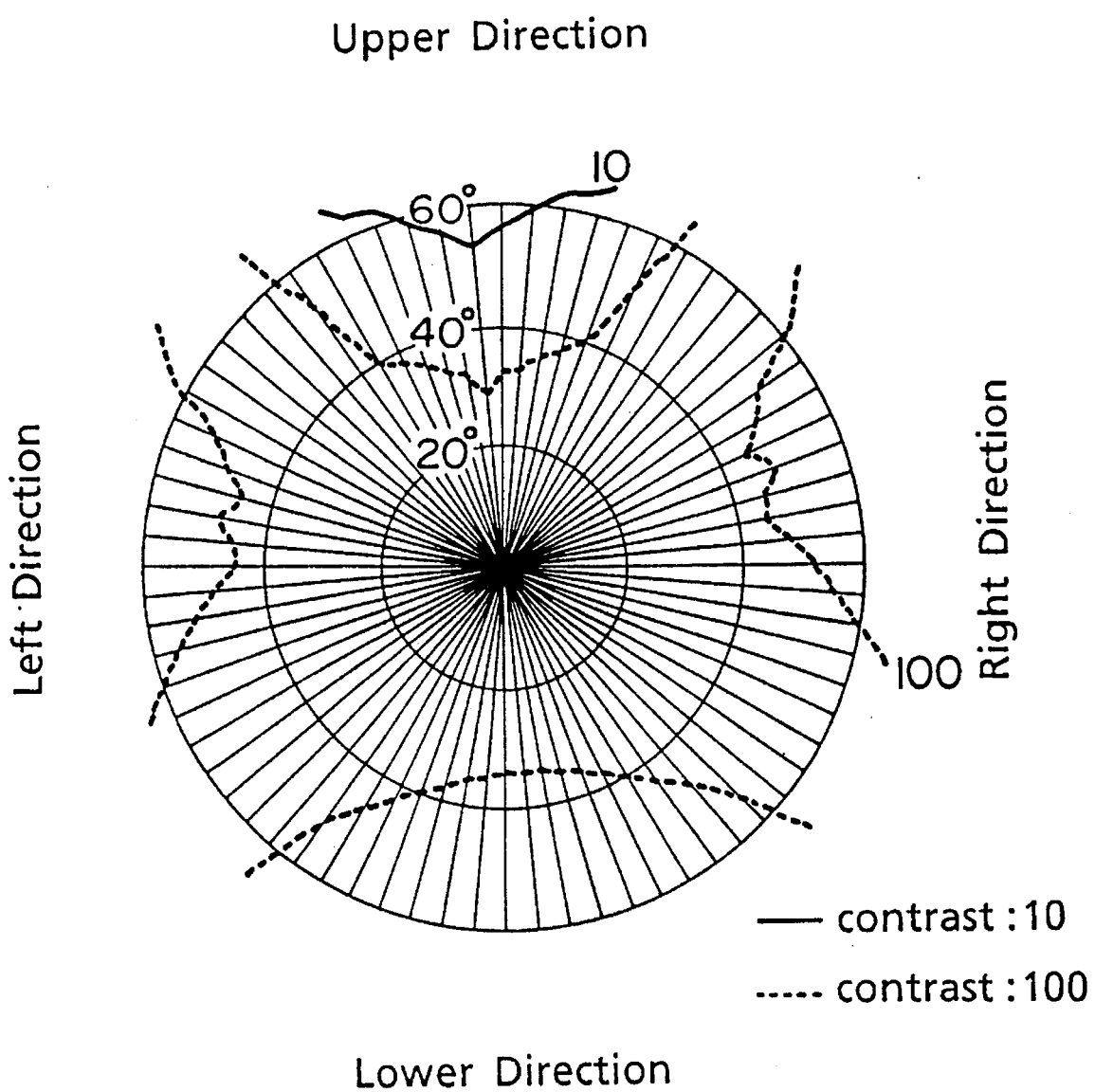
FIG. 14 is a graph indicating viewing characteristics with regard to contrast of TN-LCD obtained in Example 14.

To the TN-LCD, a rectangular wave of 1 kHz was applied at a voltage of 1 to 5 V, and transmittances (T) were measured by varying viewing angle using a spectrophotometer (LCD-5000, available from Otsuka Electronics Co., Ltd.). From the measured data, the viewing characteristics of TN-LCD obtained in Example 9 are shown in FIG. 14. The lines (bold and dot) of FIG. 14 showed curves of viewing angle showing an equal contrast line. The angle against the normal at which the contrast ($T_{1V}/T_{5V}$) on a black-and-white display showed 10 or 100 was defined as viewing angle.

EXAMPLES 10 and 11

Preparation Of color liquid crystal display

From a TFT-type color liquid crystal television (6E-3C, available from Sharp Corporation), the polarizing plates were removed. Two optical compensatory sheets (OCSB) obtained in Example 2 were fixed on the television, and two polarizing plates were attached to both sides of the sheet fixed television in such a manner that two polarizing axes of the polarizing plates intersected at right angles. Thus, a color liquid crystal display was prepared.

The optical compensatory sheet obtained Example 3 was also attached to both sides of TFT-type color liquid crystal cell in the same manner as above.

COMPARISON EXAMPLE 6

Preparation of liquid crystal display

From a TFT-type color liquid crystal television (6E-3C, available from Sharp Corporation), the polarizing plates were removed. The polarizing plates (two plates), which are the same as used Example 10, were attached to both sides of the sheet fixed television in such a manner that two polarizing axes of the polarizing plates intersected at right angles. Thus, a color liquid crystal display was prepared.

Evaluation of color liquid crystal display

White image and black image were displayed using the obtained color liquid crystal displays. In the display, transmittances (T) were measured by varying viewing angle using a spectrophotometer (LCD-5000, available from Otsuka Electronics Co., Ltd.). From the measured data, the angle against the normal at which the contrast (white/black) on a black-and-white display showed 10 was defined as viewing angle and the viewing angles in a height (upper-lower) direction and a width (left-right) direction of the TN-LCD were determined.

The obtained result is set forth in Table 3.

TABLE 3

| Example | Sheet No. | Viewing Angle | |
|---|---|---|---|
| | | upper-lower (degree) | left-right (degree) |
| Ex. 10 | OCS-B | 123 | 115 |
| Ex. 11 | OCS-C | 130 | 120 |
| Co. Ex. 6 | None | 50 | 70 |

As is apparent from results of Table 3, the color liquid crystal displays (Examples 10–11) showed enlarged viewing angle in black and white display compared with one obtained in Comparison Example 6.

In the case that video-signals were inputted into the color liquid crystal display of Comparison Example 6 and the inputted signals were outputted (displayed), the resultant image was yellowish all over displayed area and was seen whitely when viewed from the upside. Further, the black displayed portion of the resultant image was easily reversed when viewed from the upside. Moreover, although the reversion of the black displayed portion was not seen when viewed from the left or right side, the image was yellowish and contrast was wholly lowered.

In the case that video-signals, were inputted into the color liquid crystal display of Examples 10 and 11 and the inputted signals were outputted (displayed), the resultant image was almost free from the above yellowish, reversion and lowering of contrast although the reversion of black displayed portion was seen only when viewed from the lower side of greatly enlarged angle.

We claim:

1. An optical compensatory sheet which comprises a transparent support and an optically anisotropic layer provided thereon, wherein the optically anisotropic layer comprises a compound having one or more discotic structure units in its molecule and has a negative birefringence, and the discotic structure units have planes inclined from a plane of the transparent support at angles varying along a direction of depth of the optically isotropic layer.

2. The optical compensatory sheet as defined in claim 1, wherein the angles increase with an increase of distance in the direction of depth from the bottom of the optically anisotropic layer.

3. The optical compensatory sheet as defined in claim 1, wherein the angle varies within the range of 5 to 85 degree.

4. The optical compensatory sheet as defined in claim 1, wherein the optically anisotropic layer further contains cellulose ester.

5. The optical compensatory sheet as defined in claim 1, wherein the optically anisotropic layer further contains acetylbutyrylcellulose.

6. The optical compensatory sheet as defined in claim 1, wherein the optical compensatory sheet has a haze of not more than 5.0.

7. The optical compensatory sheet as defined in claim 1, wherein the optically anisotropic layer is in the condition of mono-domain or in the condition of domains of a size of not more than 0.1 μm.

8. The optical compensatory sheet as defined in claim 1, wherein an orientation layer is provided between the transparent support and the optically anisotropic layer.

9. The optical compensatory sheet as defined in claim 8, wherein a subbing layer is provided between the orientation layer and the transparent support.

10. The optical compensatory sheet as defined in claim 1, wherein the optically anisotropic layer has the minimum absolute retardation value in a direction inclined from the normal of the sheet, the minimum value being not zero.

11. The optical compensatory sheet as defined in claim 1, wherein the transparent support has a light transmittance of not less than 80% and has its optic axis in a direction of the normal of the support.

12. A liquid crystal display comprising a liquid crystal cell which comprises a pair of substrates provided with a transparent electrode and twist-oriented nematic liquid crystal sealed therebetween, a pair of polarizing sheets arranged on both sides of the cell, and an optical compensatory sheet provided between the liquid crystal cell and the polarizing sheet;

wherein the optical compensatory sheet comprises a transparent support and an optically anisotropic layer provided thereon, and the optically anisotropic layer comprises a compound having one or more discotic structure units in its molecule and has a negative birefringence, the discotic structure units having planes inclined from a plane of the transparent support at angles varying along a direction of depth of the optically anisotropic layer.

13. The liquid crystal display as defined in claim 12, wherein the angles increase with an increase of distance in the direction of depth from the bottom of the optically anisotropic layer.

14. The liquid crystal display as defined in claim 12, wherein the optically anisotropic layer further contains cellulose ester.

15. The liquid crystal display as defined in claim 12, wherein an orientation layer is provided between the transparent support and the optically anisotropic layer.

16. The liquid crystal display as defined in claim 12, wherein the optically anisotropic layer has the minimum absolute retardation value in a direction inclined from the normal of the sheet, the minimum value being not zero.

17. The liquid crystal display as defined in claim 16, wherein the substrates of the liquid crystal cell have a surface having been rubbed in one direction to give an orientation surface and the optical compensatory sheet is arranged in such manner that a direction given when the direction of the minimum absolute retardation value is orthographically projected on the cell has an angle of 90 to 270 degrees with the rubbing direction of the substrate of the liquid crystal cell adjacent to the optical compensatory sheet.

18. A color liquid crystal display comprising a liquid crystal cell which comprises a pair of substrates provided with a transparent electrode, a transparent electrode of picture element and color filter, and twist-oriented nematic liquid crystal sealed between the substrates, a pair of polarizing sheets arranged on both sides of the cell, and an optical compensatory sheet provided between the liquid crystal cell and the polarizing sheet;

wherein the optical compensatory sheet comprises a transparent support and an optically anisotropic layer provided thereon, and the optically anisotropic layer comprises a compound having one or more discotic structure units in its molecule and has a negative birefringence, the discotic structure units having planes inclined from a plane of the transparent support at angles varying along a direction of depth of the optically anisotropic layer.

19. The color liquid crystal display as defined in claim 18, wherein the angles increase with an increase of distance in the direction of depth from the bottom of the optically anisotropic layer.

20. The color liquid crystal display as defined in claim 18, wherein the optically anisotropic layer further contains cellulose ester.

21. The color liquid crystal display as defined in claim 18, wherein an orientation layer is provided between the transparent support and the optically anisotropic layer.

22. The color liquid crystal display as defined in claim 18, wherein the optically anisotropic layer has a direction showing the minimum of absolute values of retardation values which is inclined from the normal of the sheet and is not optic axis.

23. The color liquid crystal display as defined in claim 22, wherein the substrates of the liquid crystal cell have a surface having been rubbed in one direction to give an orientation surface and the optical compensatory sheet is arranged in such manner that a direction given when the direction of the minimum absolute retardation value is orthographically projected on the cell has an angle of 90 to 270 degrees with the rubbing direction of the substrate of the liquid crystal cell adjacent to the optical compensatory sheet.

* * * * *